(12) United States Patent
Toda et al.

(10) Patent No.: US 11,405,534 B2
(45) Date of Patent: Aug. 2, 2022

(54) ELECTRONIC APPARATUS

(71) Applicant: CANON KABUSHIKI KAISHA, Tokyo (JP)

(72) Inventors: Daisuke Toda, Kanagawa (JP); Jun Kamiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/214,415

(22) Filed: Mar. 26, 2021

(65) Prior Publication Data

US 2021/0306531 A1    Sep. 30, 2021

(30) Foreign Application Priority Data

Mar. 30, 2020 (JP) .............................. JP2020-059991

(51) Int. Cl.
  *H04N 5/225*  (2006.01)
  *H04N 5/232*  (2006.01)
  *H01Q 17/00*  (2006.01)

(52) U.S. Cl.
  CPC ......... *H04N 5/2253* (2013.01); *H01Q 17/004* (2013.01); *H04N 5/2257* (2013.01); *H04N 5/23264* (2013.01)

(58) Field of Classification Search
  CPC ............... H04N 5/2253; H04N 5/2257; H04N 5/23264; H04N 5/23261; H04N 5/23287; H04N 5/22521; H01Q 17/004
  See application file for complete search history.

(56) References Cited

U.S. PATENT DOCUMENTS

2016/0316121 A1* 10/2016 Park ..................... G02B 27/646
2017/0041513 A1*  2/2017 Yang ..................... H04N 5/2253

FOREIGN PATENT DOCUMENTS

JP    2010-192749 A      9/2010
JP    2016018789 A   *  2/2016

* cited by examiner

*Primary Examiner* — Padma Haliyur
(74) *Attorney, Agent, or Firm* — Cowan, Liebowitz & Latman, P.C.

(57) ABSTRACT

An image pickup apparatus includes an image pickup unit and a control unit that controls the unit. The control unit has a control substrate, and the image pickup unit and the control substrate are electrically connected by a flexible substrate. The flexible substrate has a first connection portion connected to the image pickup unit, a wiring portion extending from the first connection portion, and a second connection portion connected to the control substrate. A plurality of curved portions is formed on the flexible substrate, and a sheet-like radio wave absorber is partially fixed to the flexible substrate through a plurality of insulating reinforcing materials.

16 Claims, 15 Drawing Sheets

ELECTRONIC APPARATUS

BACKGROUND OF THE INVENTION

Field of the Invention

The present invention relates to an electronic apparatus including a flexible wiring member electrically connected to a movable member.

Description of the Related Art

A flexible substrate having flexibility is used for electrical connections in an electronic apparatus. For example, the flexible substrate connects a movable unit (movable member) supported by a fixing unit (support member) in a displaceable state to a control substrate. In an image pickup apparatus having an optical image shake correction function, a movable unit supporting an image pickup element moves in a direction orthogonal to an optical axis with respect to the fixing unit. Japanese Patent Laid-Open No. 2010-192749 discloses an image pickup apparatus in which the drive control of the movable unit is performed by a control substrate while the fixing unit and the movable unit are electrically connected.

A part of a wiring portion of the flexible substrate can be deformed in accordance with the displacement of the movable unit. In this case, a reaction force generated by the deformation of the wiring portion becomes a load when the movable unit is driven. If the flexibility of the flexible substrate is low, the drive of the movable unit may be inhibited. Therefore, it is preferable that the flexible substrate is formed of a thin layer to enhance the flexibility, and that the flexible substrate is provided with wiring having a narrow width.

However, in recent years, the power consumption and the number of connection signals of the image pickup element has tended to increase due to the increase in the number of pixels of moving images and the improvement in functions such as high-speed continuous shooting in the image pickup apparatus. For this reason, if a flexible substrate formed of a thin layer and provided with a narrow wiring is used to achieve high-speed transmission of more signals, the communication performance may not be stable and cause a radiation source of an electromagnetic field noise (unwanted radiation). As a method for reducing the electromagnetic field noise, there is a method for adding a shield layer to the flexible substrate. In the conventional method, the flexibility of the flexible substrate may be impaired, and the driving of the movable unit may be inhibited.

SUMMARY OF THE INVENTION

The present invention is to provide an electronic apparatus that can reduce electromagnetic field noise while suppressing an increase in loads when a movable member is displaced.

An electronic apparatus according to the embodiment of the present invention comprises a movable member and a support member configured to support the movable member; a controller configured to control a circuit unit provided in the movable member; a first wiring member configured to have flexibility and electrically connect the circuit unit and the controller; a radio wave absorber formed in a sheet shape; and a separation member configured to separate the radio wave absorber from the first wiring member. The first wiring member comprises a first connection portion configured to be connected to the circuit unit; a second connection portion configured to be connected to the controller; and a wiring portion configured to extend from the first connection portion to the second connection portion, and wherein the radio wave absorber is fixed to any one of a plurality of curved portions of the first wiring member through the separation member, or is fixed to a position different from the curved portions through the separation member.

Further features of the present invention will become apparent from the following description of exemplary embodiments with reference to the attached drawings.

DESCRIPTION OF THE EMBODIMENTS

Hereinafter, embodiments of the present invention will be described in detail with reference to drawings. In each embodiment, an image pickup apparatus is shown as an example of an electronic apparatus to which the wiring structure of the flexible substrate according to the present invention is applied.

First Embodiment

Figure 1A:
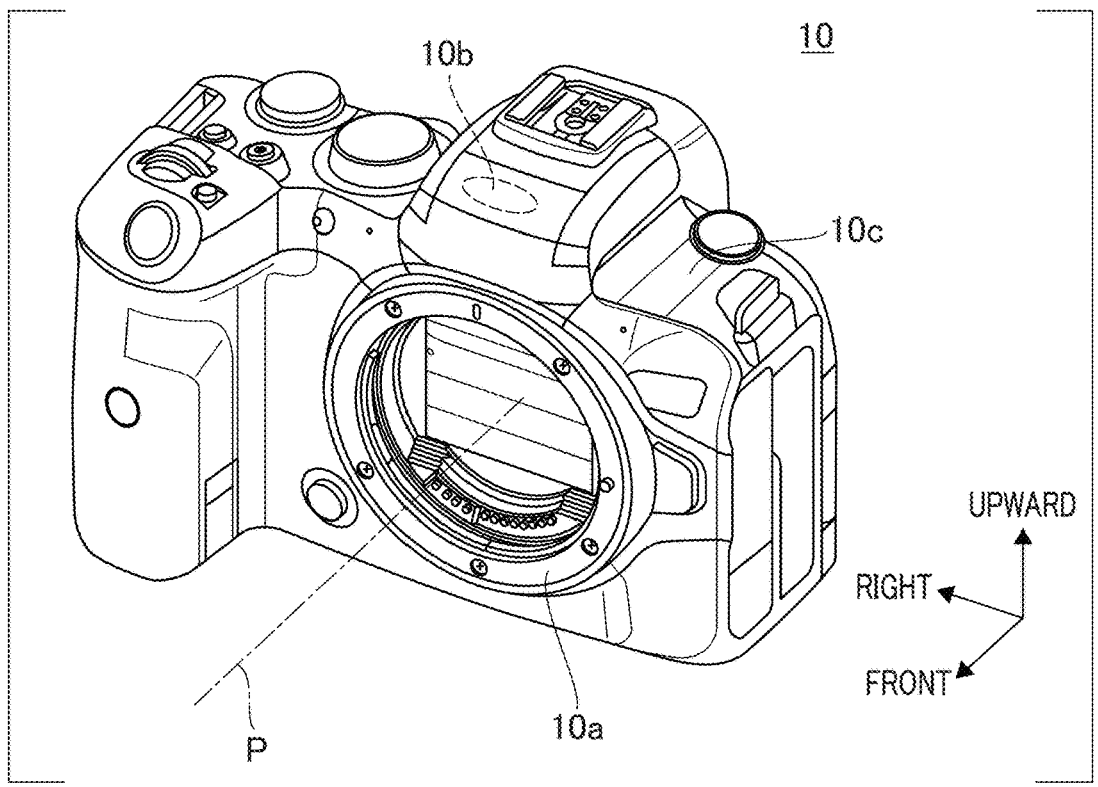
FIGS. 1A and 1B are perspective views of an electronic apparatus according to an embodiment.
Figure 1B:
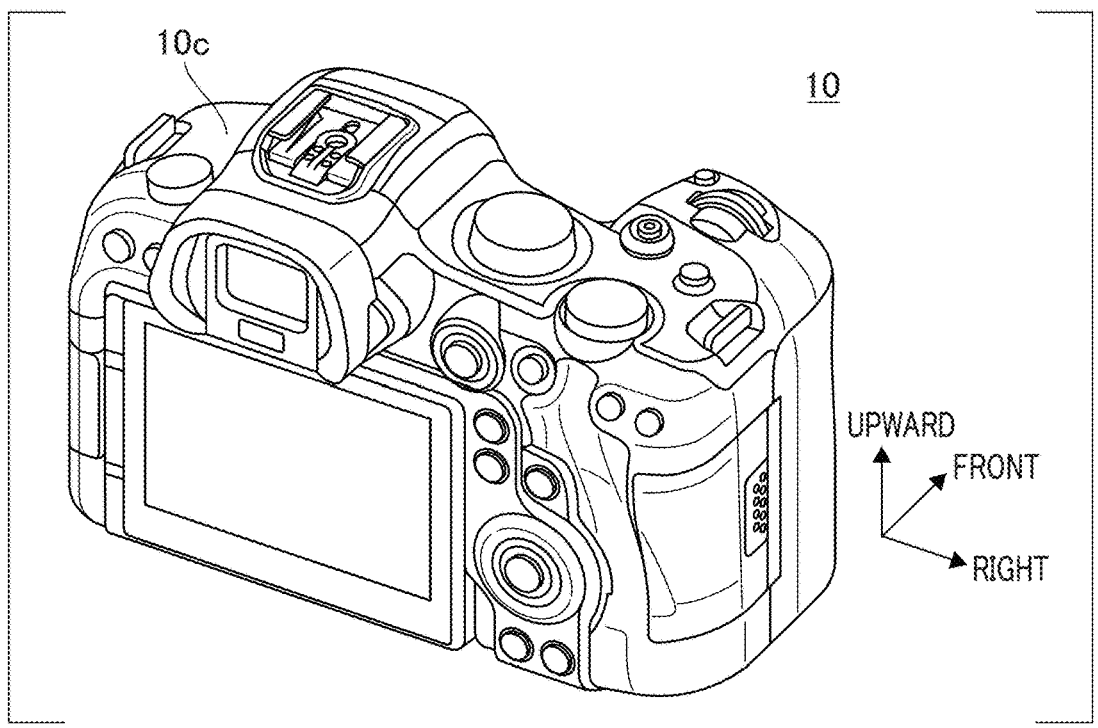

FIGS. 1A and 1B are perspective views of an image pickup apparatus 10. Regarding the direction of the image pickup apparatus 10, an object side is defined as the front side by using the direction as viewed from a photographer (user) as a reference, and the upward and downward direction, the front-rear direction, and the right and left direction as viewed from the user facing the rear of the image pickup apparatus 10 are respectively defined. Accordingly, FIG. 1A is a perspective view of the image pickup apparatus 10 when viewed from the front and FIG. 1B is a perspective view of the image pickup apparatus 10 when viewed from the rear. In the present embodiment, as an example of an application to an image pickup apparatus, although a lens interchangeable camera in which a lens device can be mounted on a camera body is shown, the present invention is applicable to a camera in which the camera body and the lens unit are integrated.

The image pickup apparatus 10 is provided with an exterior unit 10c, and the exterior unit 10c is configured by a plurality of members. The image pickup apparatus 10 has a mount 10a on the front side, and an interchangeable lens (lens device) (not illustrated) can be mounted on the mount 10a. A radio antenna 10b is built in the upper portion of the mount 10a. The radio antenna 10b is used when the image pickup apparatus 10 communicates with an external device. The axis passing through the center of the mount 10a is substantially identical with an optical axis P (refer to the one dot chain line) of an imaging optical system of the interchangeable lens, that is, the image pickup optical axis.

Figure 2:
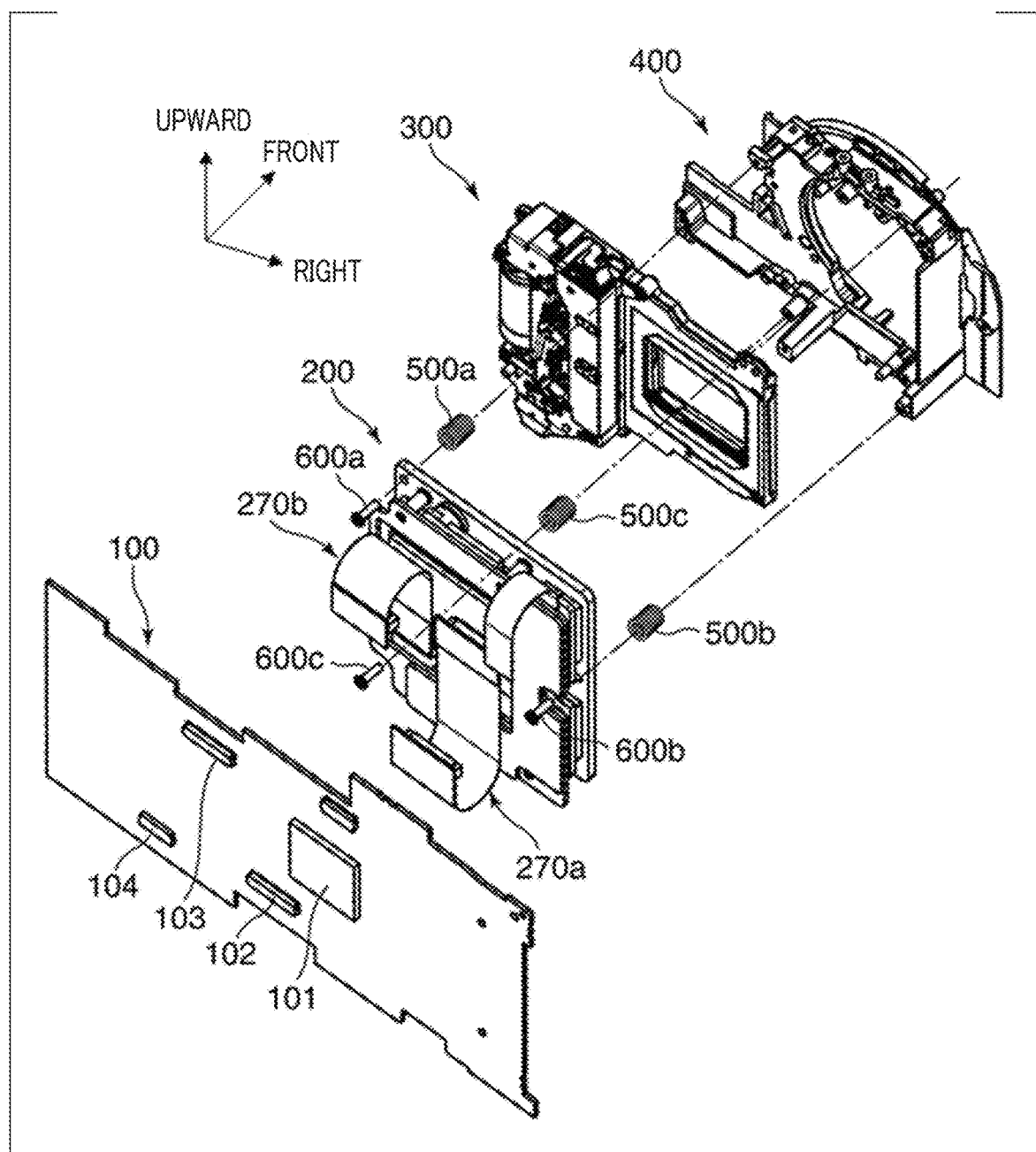
FIG. 2 is an exploded perspective view illustrating a principal part of the electronic apparatus according to the embodiment.

FIG. 2 is an exploded perspective view of a principal part of the image pickup apparatus 10 when viewed from the back (the photographer's side). In FIG. 2, the exterior unit 10c and the like are not shown. In the drawings following FIG. 2, the parts necessary for understanding the present invention are illustrated, and unnecessary parts are omitted. The image pickup apparatus 10 has a control substrate 100, an image shake correction unit 200, a shutter unit 300, and a base member 400. The image shake correction unit 200 configures an image shake correction device that performs image shake correction of an image. A control unit (controller) of the image shake correction device is provided with the control substrate 100.

Both the image shake correction unit 200 and the shutter unit 300 are provided with a movable optical member. The image shake correction unit 200 is fixed together with the shutter unit 300 to the base member 400. The image shake correction unit 200 is held by the base member 400 on which the shutter unit 300 is assembled and fixed. For example, the image shake correction unit 200 is supported by three screws 600a, 600b, and 600c and three coil springs 500a, 500b, and 500c so as to be displaceable with respect to the base member 400 in a direction along the optical axis P (refer to FIG. 1A). An operator performs an operation of adjusting a tightening amount of the screws 600a, 600b, and 600c. Thus, the tilt of the image pickup plane of an image pickup element 230 (refer to FIG. 3) with respect to the base member 400 can be adjusted. When the adjustment of the tilt of the imaging plane is completed, the screws 600a, 600b, and 600c are adhered and fixed to a fixing unit of the image shake correction unit 200 in order to prevent loosening thereof. The fixing unit (200b) is a support member and will be described below with reference to FIG. 3.

The control substrate 100 and the base member 400 are fixed to the exterior unit 10c. The control substrate 100 is mounted with a control IC 101 used for controlling an image pickup signal and connectors 102, 103, and 104. Various electronic components (not illustrated) such as chip resistors, ceramic capacitors, inductors, and transistors are mounted on the control substrate 100. As flexible wiring members, a first flexible substrate 270a and a second flexible substrate 270b extending from the image shake correction unit 200 are shown.

The first flexible substrate 270a is connected to the connector 102, and the second flexible substrate 270b is connected to the connector 103. Thus, the control substrate 100 and the image shake correction unit 200 are electrically connected. The connector 104 disposed on the control substrate 100 is connected to a flexible substrate (not illustrated) extending from the shutter unit 300, and the control substrate 100 and the shutter unit 300 are electrically connected.

Figure 3:
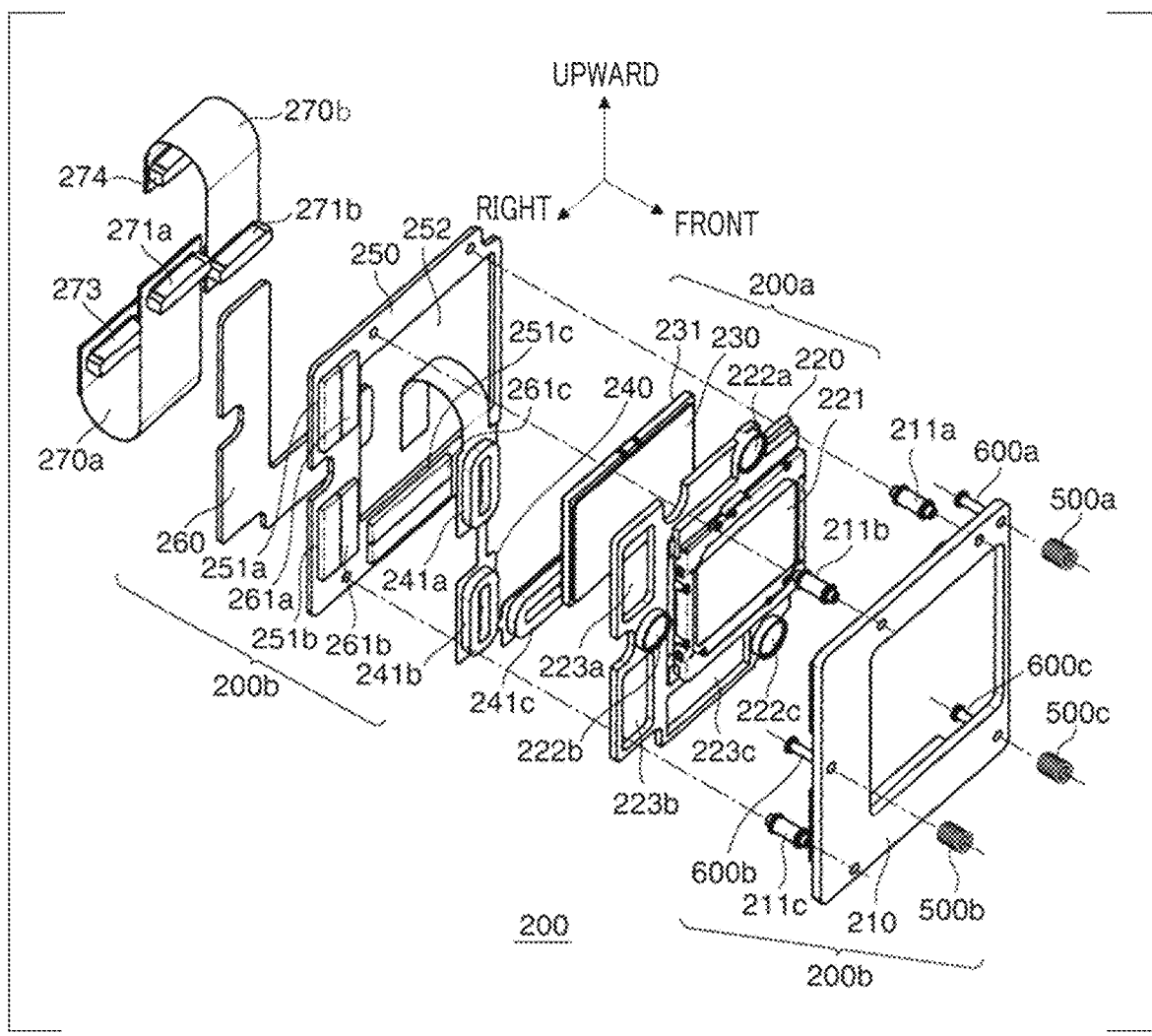
FIG. 3 is an exploded perspective view of an image shake correction unit according to the embodiment.
Figure 4:
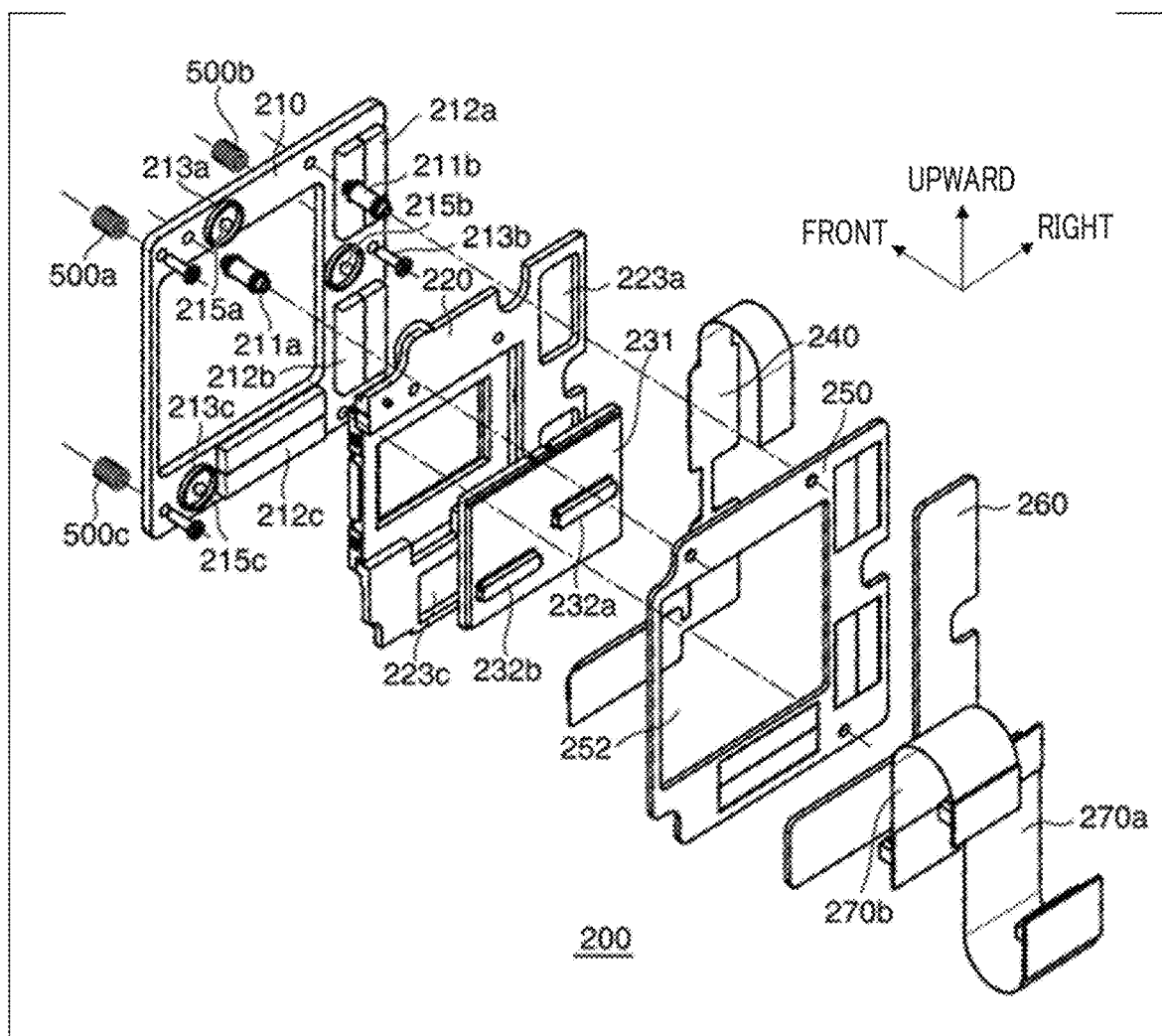
FIG. 4 is an exploded perspective view illustrating the image shake correction unit from a direction different from that of FIG. 3.

Next, with reference to FIG. 3 and FIG. 4, the image shake correction unit 200 will be described. FIG. 3 and FIG. 4 are exploded perspective views of the image shake correction unit 200. The image shake correction unit 200 has a movable unit 200a and a fixing unit 200b. The movable unit 200a is a movable member including the image pickup element 230. The fixing unit 200b is a support member fixed to the base member 400. The movable unit 200a is supported by the fixing unit 200b in a state of being displaceable in an arbitrary direction in a plane orthogonal to the optical axis P with respect to the fixing unit 200b. By moving the movable unit 200a in a direction orthogonal to the optical axis P, an optical image shake correction operation is realized.

Main components of the fixing unit 200b are a front yoke 210, a base plate 250, and a rear yoke 260. The main components of the movable unit 200a are a sensor holder 220 and a third flexible substrate 240. The first flexible substrate 270a and the second flexible substrate 270b connect the movable unit 200a and the control substrate 100. The third flexible substrate 240 connects the sensor holder 220 and the control substrate 100. The first flexible substrate 270a, the second flexible substrate 270b, and the third flexible substrate 240 are all flexible printed substrates.

The movable unit 200a includes an image pickup element substrate 231 on which the image pickup element 230 is mounted. The image pickup element 230 is a CMOS (complementary metal oxide semiconductor) image sensor or a CCD (charge-coupled device) image sensor, and converts an optical image of an object into an electric signal. The image pickup element 230 and the image pickup element substrate 231 are adhered and fixed to the sensor holder 220. In the sensor holder 220, an optical low-pass filter 221 is disposed in front of the image pickup element 230. The optical low-pass filter 221 is an optical element for preventing incidence of infrared rays and the occurrence of color moiré or the like.

The sensor holder 220 has three openings 223a, 223b, and 223c. The third flexible substrate 240 is mounted with three coils 241a, 241b, and 241c (FIG. 3). With respect to the sensor holder 220, the third flexible substrate 240 is assembled from the rear and adhered and fixed, and the coils 241a, 241b, and 241c are respectively accommodated in the openings 223a, 223b, and 223c.

Three ball receiving portions 222a, 222b, and 222c are formed on the sensor holder 220 (FIG. 3). The front yoke 210 is formed with the ball receiving portions 222a, 222b, and 222c (FIG. 4) at positions facing each of the ball receiving portions 213a, 213b, and 213c. The sensor holder 220 to which the image pickup element 230 and the image pickup element substrate 231 are adhered and fixed, and the front yoke 210 interposes the balls 215a, 215b, and 215c between the ball receiving portions facing each other. As a result, the balls 215a, 215b, and 215c are supported so as to be rotatable.

In the front yoke 210 (FIG. 4), magnets 212a, 212b, and 212c are adhered and fixed at predetermined positions on a surface facing the sensor holder 220. A plate material using a ferromagnetic material (for example, iron) (not illustrated) is adhered to a position facing the magnets 212a, 212b, and 212c in the sensor holder 220. When the front yoke 210 and the sensor holder 220 are placed in close proximity to each other by a predetermined distance, the sensor holder 220 is magnetically attracted to the front yoke 210. The sensor holder 220 is held by the front yoke 210 in a state in which it can be displaced in an arbitrary direction in a plane orthogonal to the optical axis P through the balls 215a, 215b, and 215c.

In the front yoke 210 shown in FIG. 4, the magnets 212a. 212b, and 212c are attached at positions respectively facing the coils 241a. 241b, and 241c. In the front yoke 210, supports 211a, 211b, 211 c are erected facing toward the base plate 250. One end of each of the supports 211a, 211b, and 211c is press-fitted into the base plate 250. The front yoke 210 and the base plate 250 are joined so as to sandwich the sensor holder 220.

In the base plate 250, openings 251a, 251b, and 251c are formed at different positions when viewed from the direction of the optical axis P. The openings 251a, 251b, and 251c respectively incorporate magnets 261a, 261b, and 261c. When viewed from the direction of the optical axis P, the magnets 261a, 261b, and 261c are formed in substantially the same position and shape as the corresponding coils 241a. 241b, and 241c. The magnets 261a. 261b, and 261c are arranged at positions where the centers thereof substantially match the centers of each coils 241a, 241b, and 241c.

The operator mounts the rear yoke 260 onto the base plate 250 from the rear side so that the magnets 261a. 261b, and 261c are respectively accommodated in the openings 251a. 251b, and 251c. Both the rear yoke 260 and the base plate 250 are formed of a ferromagnetic material. The operator can magnetically attract the magnets 261a, 261b, and 261c to each other simply by performing positioning and bringing the rear yoke 260 into contact with the base plate 250. Specifically, two components can be joined without using an adhesive.

An opening 252 is formed on the base plate 250. When the sensor holder 220 is held between the front yoke 210 and the base plate 250, the image pickup element substrate 231 is exposed to the rear side from the opening 252. As shown in FIG. 4, the image pickup element substrate 231 is mounted with connectors 232a and 232b. In contrast, as shown in FIG. 3, a connector 271a is mounted on the first flexible substrate 270a, and a connector 271b is mounted on the second flexible substrate 270b. The operator incorporates the first and second flexible substrates 270a and 270b from the rear of the image pickup element substrate 231 through the opening 252, fits the connector 232a and the connector 271a, and fits the connector 232b and the connector 271b. The connectors 232a and 232b and the connectors 271a and 271b are in a relation of a plug connector and a receptacle connector that fit each other. The connectors 271a and 271b have two parallel signal terminal rows.

Each of the first and second flexible substrates 270a and 270b has a long plate shape, and the connectors 271a and 271b are mounted on one end thereof. The wiring direction of the first flexible substrate 270a and the second flexible substrate 270b is a longitudinal direction, and the connectors 273 and 274 are mounted on the other end thereof in the longitudinal direction. The connector 273 has a relation of a plug connector and a receptacle connector, that is fitted to the connector 102 mounted on the control substrate 100 (refer to FIG. 2). Similarly, the connector 274 has a relation of the plug connector and the receptacle connector, that is fitted to the connector 103 mounted on the control substrate 100 (refer to FIG. 2). Similar to the connectors 271a and 271b, the connectors 273 and 274 are configured to have two parallel signal terminal rows.

By connecting the connectors 271a and 271b (refer to FIG. 3) and the connectors 232a and 232b (refer to FIG. 4), the first and second flexible substrates 270a and 270b are each electrically connected to the image pickup element substrate 231. Thereby, the connectors 271a and 271b are fixed to the movable unit 200a.

Figure 5:
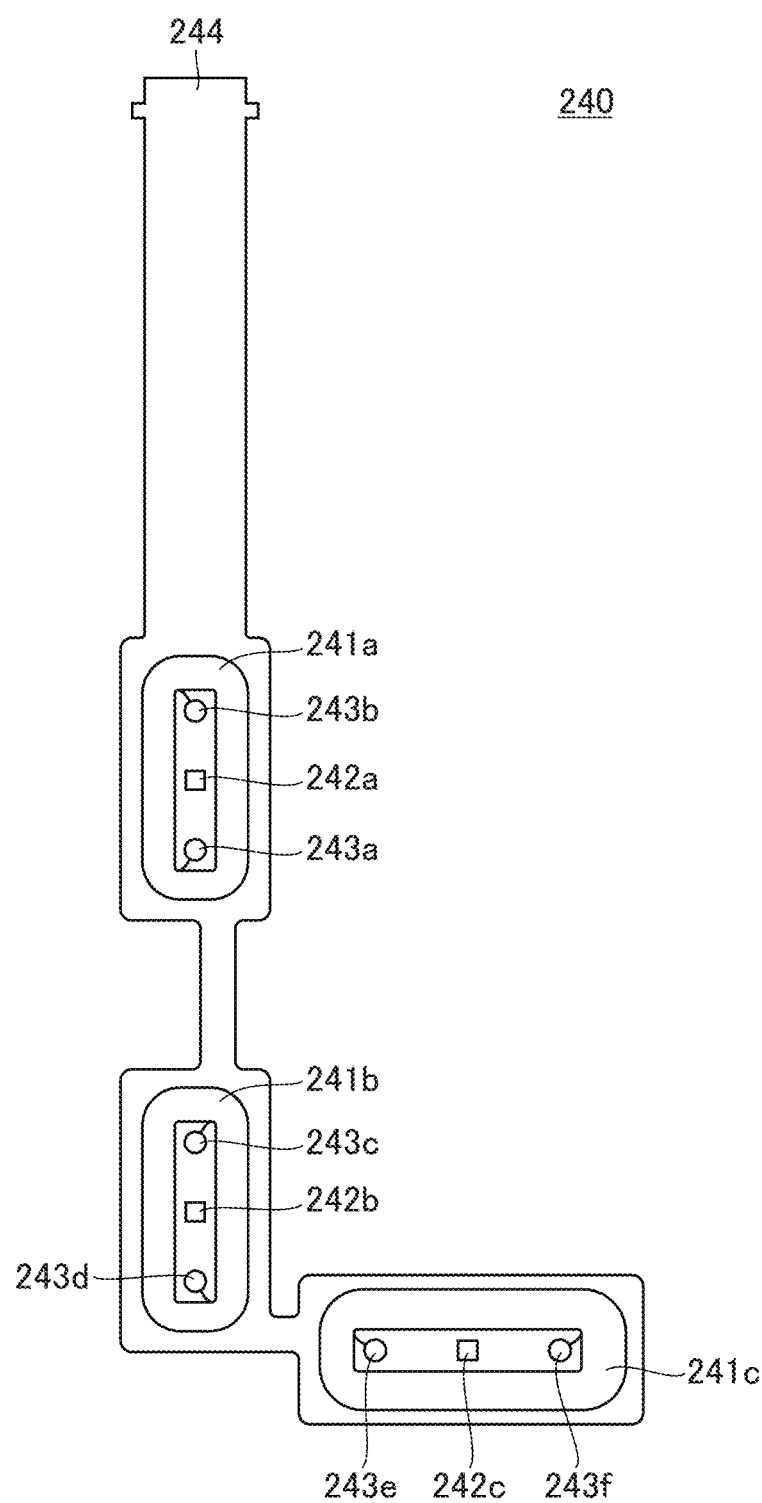
FIG. 5 is a front view of a flexible substrate according to the first embodiment.

Next, with reference to FIG. 5, the third flexible substrate 240 will be described. FIG. 5 is a front view of the third flexible substrate 240. The coils 240a, 241b, and 241c are adhered and fixed to the third flexible substrate 241. On the third flexible substrate 240, soldering lands 243a, 243b, 243c, 243d, 243e, and 243f are formed for electrically connecting to the windings of the coils. A soldering operation for each end of the coil 241a, which is the winding start and the winding end, is performed on the soldering lands 243a and 243b. Similarly, the soldering operation for each end of the coil 241b, which is the winding start and the winding end, is performed on the soldering lands 243c and 243d. The soldering operation for each end of the coil 241c, which is the winding start and winding end, is performed on the soldering lands 243e and 241f. By the soldering operation, each coil is electrically connected to the third flexible substrate 240.

On the third flexible substrate 240, Hall elements 242a, 242b, and 242c are respectively mounted inside the windings of the coils 241a, 241b, and 241c. Each Hall element is arranged at a substantially intermediate position of a plurality of soldering lands forming a pair inside a corresponding coil winding. In the third flexible substrate 240, a connector terminal 244 is formed at one end in the longitudinal direction. A plurality of wiring patterns from each soldering land and each Hall element is deployed inside the third flexible substrate 240 and connected to the connector terminal 244. The connector terminal 244 is connected to a connector mounted on the control substrate 100.

Thus, the magnets 212a, 212b, and 212c disposed on the front yoke 210 and the magnets 261s, 261b, 261c disposed on the rear yoke 260 form a magnetic path, and the coils 241a. 241b, and 241c are arranged in a magnetic field environment. The control unit controls the currents of these coils to generate the Lorentz force in each coil. The sensor holder 220 can be displaced in an arbitrary direction in a plane orthogonal to the optical axis P by using the Lorentz force as a thrust. The Hall elements 242a, 242b, and 242c are mounted inside each of the coils 241a, 241b, and 241c, and detect changes in a magnetic force due to the movement of the sensor holder 220 relative to the magnets 212a, 212b, and 212c. Based on the detection signal of each Hall element, the relative displacement of the movable unit 200a with respect to the fixing unit 200b, that is, displacement in an arbitrary direction in a plane orthogonal to the optical axis P, can be detected.

In a state in which the image shake correction unit 200 is assembled, the positional relations of the coils 241a, 241b, and 241c with respect to the image pickup element 230 differ. In the definition of the direction described above, the coil 240c is located in the lower right portion and the coil 241a is located in the upper right portion with respect to the image pickup element 230. On the control substrate 100 (refer to FIG. 2), the connectors 102 and 104 are mounted at the lower position and the connector 103 is mounted at the upper position. On the control substrate 100, the connectors 102, 103, and 104 are mounted on the rear surface. On the image pickup element substrate 231 (refer to FIG. 4), the connectors 232a and 232b are mounted on the rear surface.

The image shake directions in the image pickup apparatus 10 are a pitch direction, a yaw direction, and a roll direction. The pitch direction and the yaw direction are two directions around axes perpendicular to the optical axis P of the imaging optical system and orthogonal to each other, and the roll direction is a direction around an axis parallel to the optical axis P. In the case of correcting an image shake in the pitch direction, which is the rotation about the axis in the right and left direction, the movable unit 200a is translated in the upward and downward direction. In the case of correcting an image shake in the yaw direction, which is a rotation around the axis in the upward and downward direction, the movable unit 200a translationally moves in the right and left direction. In the case of correcting an image shake in the roll direction, which is a rotation about the axis in the front-rear direction, the movable unit 200a rotates about an axis parallel to the axis in the front-rear direction.

Figure 6:
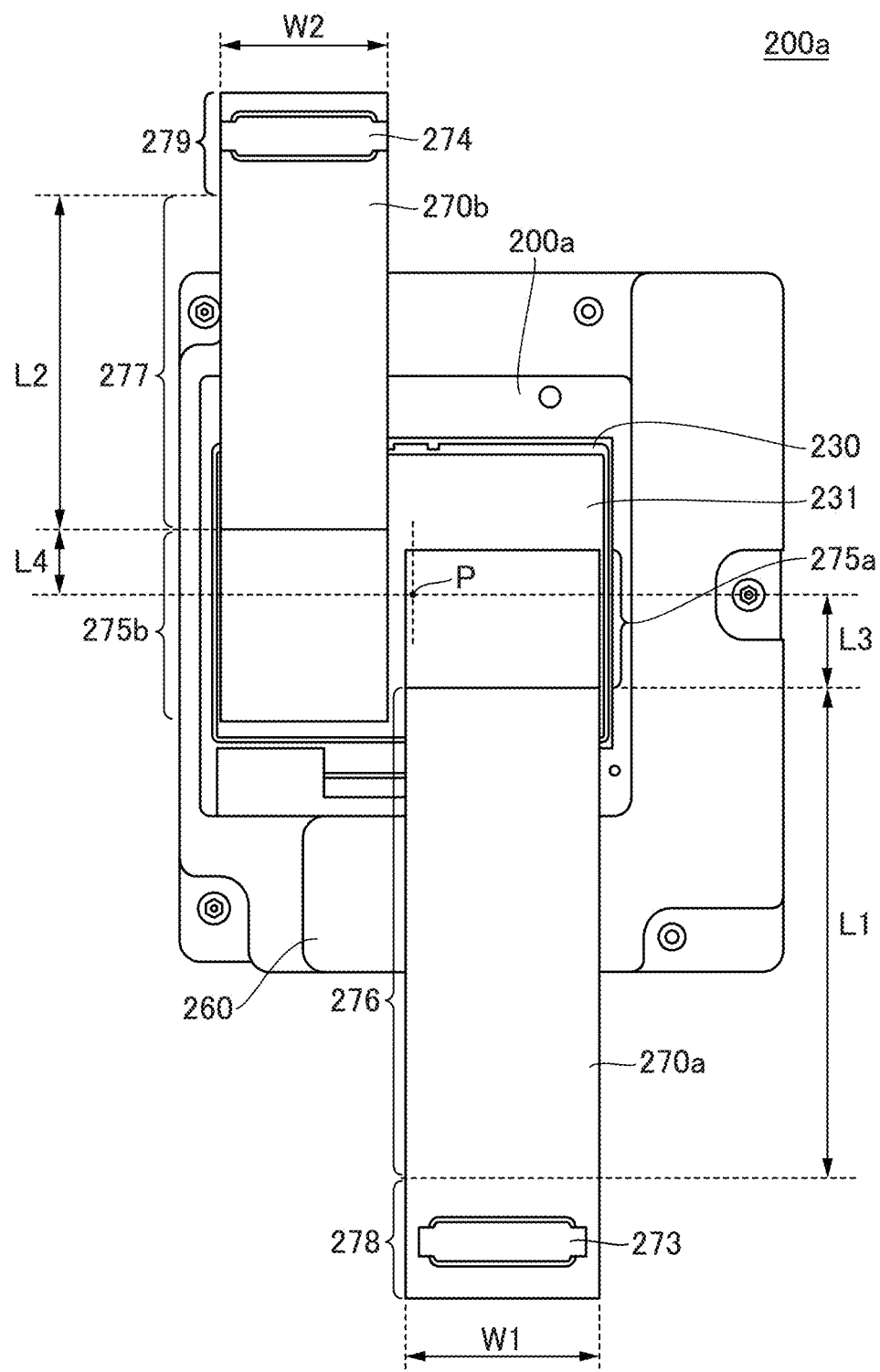
FIG. 6 is a rear view of a movable unit to which a plurality of flexible substrates is fixed according to the first embodiment.
Figure 7:
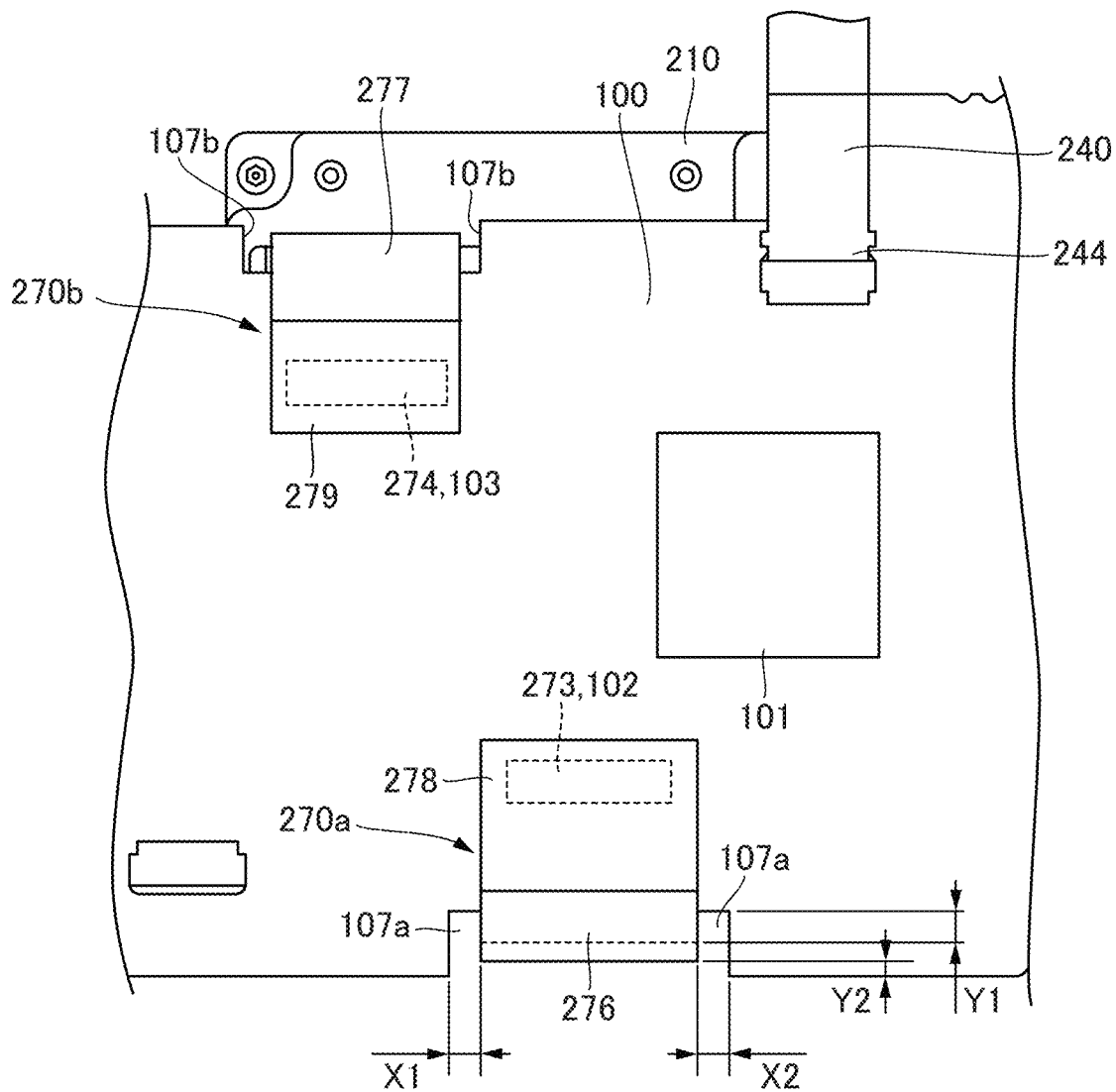
FIG. 7 illustrates a state in which the movable unit is attached to a control substrate according to the first embodiment.
Figure 8:
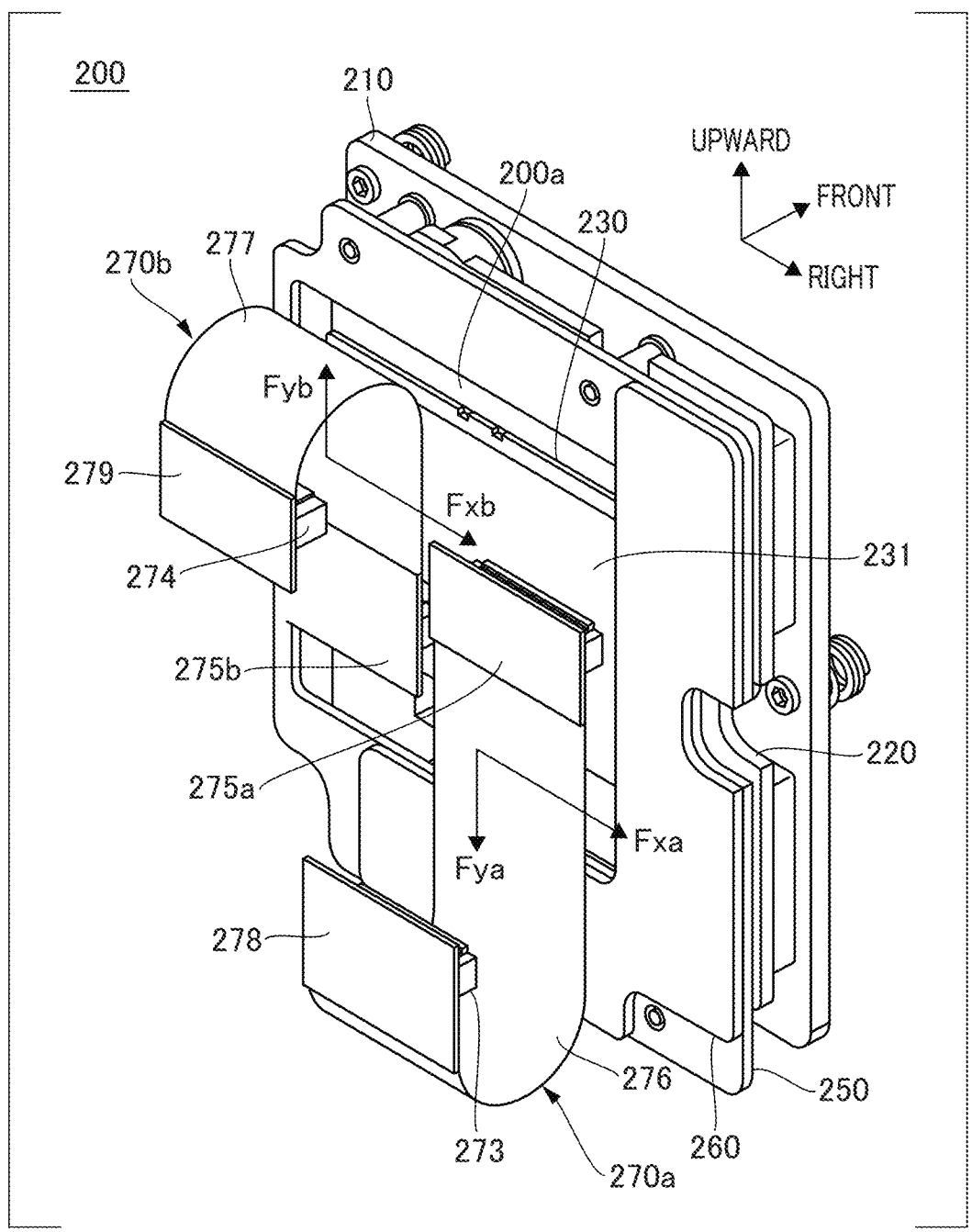
FIG. 8 is a perspective view of the image shake correction unit and the flexible substrate according to the first embodiment

Next, with reference to FIG. 6 to FIG. 8, the configurations of the first and second flexible substrates 270a and 270b will be described. FIG. 6 is a rear view illustrating the movable unit 200a in a state in which the first flexible substrate 270a and the second flexible substrate 270b are fixed. FIG. 7 is a rear view of a state in which the movable unit 200a, to which the first flexible substrate 270a and the second flexible substrate 270b are fixed, is attached to the control substrate 100. In FIG. 7, the connectors 273 and 274 are respectively connected to the connectors 102 and 103. FIG. 8 is a perspective view of the image shake correction unit 200.

As shown in FIG. 6, each of the first flexible substrate 270a and the second flexible substrate 270b is broadly divided in to three regions, that is, two rigid portions (connecting portions) and a flexible portion (wiring portion) connecting the rigid portions. The rigid portion (connecting portion) is made rigid by bonding an insulating reinforcing material, for example, a glass epoxy resin to the flexible portion (wiring portion) with a thermosetting adhesive or the like, and the connectors are mounted on the surface of the flexible portion (wiring portion).

The first flexible substrate 270a has a first connection portion 275a, a first wiring portion 276, and a second connection portion 278 in order from the side close to the connector 271a (refer to FIG. 3) in the wiring direction that is its longitudinal direction. The first wiring portion 276 extends from the first connection portion 275a in a first direction orthogonal to the optical axis P. The first direction is the downward direction in FIG. 6. The connector 271a is disposed at the first connecting portion 275a, and the connector 273 is disposed at the second connection portion 278.

The second flexible substrate 270b has a third connection portion 275b, a second wiring portion 277, and a fourth connection portion 279 in order from the side close to the connector 271b (refer to FIG. 3) in the wiring direction that is its longitudinal direction. The second wiring portion 277 extends from the third connection portion 275b in a second direction orthogonal to the optical axis P. The second direction is the direction opposite to the first direction, that is, the upward direction in FIG. 6. The connector 271b is disposed at the third connection portion 275b and the connector 274 is disposed at the fourth connection portion 279.

The first connection portion 275a, the third connection portion 275b, the second connection portion 278, and the fourth connection portion 279 are made rigid by bonding an insulating reinforcing material, for example, a glass epoxy resin with a thermosetting adhesive or the like. The connectors (connectors 271a, 271b, 273, and 274) connecting between substrates are mounted on a surface opposite to a surface to which the insulating reinforcing material is adhered at these connection portions.

In the wiring direction of the first flexible substrate 270a shown in FIG. 6, the first wiring portion 276 is disposed in a region between the first connection portion 275a and the second connection portion 278. The first wiring portion 276 has flexibility and electrically connects the connector 271a and the connector 273. In the wiring direction of the second flexible substrate 270b, the second wiring portion 277 is disposed in a region between the third connection portion 275b and the fourth connection portion 279. The second wiring portion 277 has flexibility and electrically connects the connector 271a and the connector 274.

As shown in FIG. 7, cutouts are respectively formed in the lower and upper sides of the control substrate 100. The lower side (edge in the first direction) is formed with a first cutout 107a, and the upper side (edge in the second direction) is formed with a second cutout 107b. The first wiring portion 276 of the first flexible substrate 270a is wired through the first cutout 107a, and the second wiring portion 277 of the second flexible substrate 270b is wired through the second cutout 107b. That is, the first wiring portion 276 extends downward from the first connection portion 275a, and then curves backward, passes through the first cutout 107a, and extends upward. The connector 273 is fit to the connector 102. In contrast, the second wiring portion 277 extends upward from the third connection portion 275b, then curves backward, passes through the second cutout 107b, and extends downward. The connector 274 is fit to the connector 103.

In the configuration shown in FIG. 7, the second wiring portion 277 and the first wiring portion 276 are wired so as to cover a part of the control substrate 100 in the upward and downward directions. The second wiring portion 277 and the first wiring portion 276 are extracted by dividing into two routes in the pitch direction of vibration causing an image shake, in other words, in the upward and downward direction that is the translational direction of the movable unit 200a. By setting such an extracting direction, when the movable unit 200a is driven to the right and when the movable unit 200a is driven to the left, the loads caused by the deformation of the flexible substrates 270a and 270b can be brought close to a uniform size. Specifically, it is possible to suppress a difference in the load due to a difference in the driving direction of the movable unit 200a.

With reference to FIG. 8, a description will be given of the load caused by the deformation of the flexible substrates 270a and 270b and the control of the movable unit 200a. Here, it is assumed that the movable unit 200a moves to the left. In this case, reaction forces Fxa and Fxb in the right direction, reaction forces Fya in the downward direction, and reaction forces Fyb in the upward direction are generated. That is, the reaction forces Fxa and Fxb in the right direction are generated as the reaction forces respectively generated by the flexible substrates 270a and 270b. Additionally, in the upward and downward direction, the downward reaction forces Fya are generated as the reaction forces of the first flexible substrate 270a, and the upward reaction forces Fyb are generated as the reaction forces of the second flexible substrate 270b.

In the first flexible substrate 270a and the second flexible substrate 270b, the drawing directions are divided into two routes in the upward and downward direction. Accordingly, since the reaction forces Fya and the reaction forces Fyb are substantially equal in magnitude, it is possible to balance the load in the upward and downward direction. Hence, the loads of the first flexible substrate 270a and the second flexible substrate 270b are generated substantially only in the right direction, and the magnitude thereof is the sum of the reaction forces Fxa and the reaction forces Fxb. Therefore, since the load in the upward and downward direction becomes almost zero, only the drive control in the right and left direction is performed, and consequently the control becomes simple. The increased load and the increased complexity of the control cause an increase in the size of the magnet and the coil required for high-precision control, resulting in an increase in the size of the image pickup apparatus 10. Therefore, simplifying control while suppressing an increase in the load contributes to miniaturization of the image pickup apparatus 10 and a reduction of power consumption.

With reference to FIG. 6, the dimensions of the first and second flexible substrates 270a and 270b will be described. The length L1 is the length, in the wiring direction of the first flexible substrate 270a, from the boundary between the first wiring portion 276 and the first connection portion 275a to the boundary between the first wiring portion 276 and the second connection portion 278, and corresponds to the length of the first wiring portion 276. The length L2 is the length, in the wiring direction of the second flexible substrate 270b, from the boundary between the second wiring portion 277 and the third connection portion 275b to the boundary between the second wiring portion 277 and the fourth connection portion 279, and corresponds to the length of the second wiring portion 277. In the upward and downward direction that is a wiring direction, the length L3 is the length from the optical axis P to the boundary between the first connection portion 275a and the first wiring portion 276. The length L4 is the length from the optical axis P to the boundary between the third connection portion 275b and the second wiring portion 277. In the right and left direction, the width W1 is the width of the first wiring portion 276, and the width W2 is the width of the second wiring portion 277.

Basically, in order to make the balance in the load caused by the deformation of the first flexible substrate 270a and the second flexible substrate 270b more uniform, it is preferable that the length L1 and the length L2 are set substantially the same, and the length L3 and the length L4 are set substantially the same. Further, it is preferable that the width W1 and the width W2 are set substantially the same. The phrase "substantially the same" means that the difference in the length L or the width W is equal to or less than a predetermined threshold within a tolerance.

In contrast, since the loads caused by the deformation of each flexible substrate are different depending on the layer configuration and the wiring width thereof, the length L and the width W are adjusted so as to cancel the variation of the load. As a result, the loads caused by the deformation of the first flexible substrate 270a and the second flexible substrate 270b can be made closer to a more uniform size, which contributes to the miniaturization of the image pickup apparatus 10 and the reduction of power consumption.

FIG. 7 illustrates an initial state in which the movable unit 200a is not displaced. In the initial state, the lengths X1 and X2 in the right and left direction respectively represent the interval between the first wiring portion 276 and the first cutout 107a. That is, with respect to the interval between the first wiring portion 276 and the first cutout 107a, the interval on the left side is denoted by length "X1", and the interval on the right side is denoted by length "X2". The cutout width in the right and left direction of the first cutout 107a is "Width of the first wiring portion 276+(X1+X2)".

In contrast, with respect to the lengths Y1 and Y2 in the upward and downward direction, the interval between the position in the depth direction of the first cutout 107a and the lowermost end of the inner surface of the curved shape of the first wiring 276 is denoted by length "Y1". The interval between the lower end position of the outermost contour of the control substrate 100 and the outer surface of the curved shape of the first wiring portion 276 is denoted by length "Y2".

Even when the movable unit 200a is displaced to the maximum extent with respect to the fixing unit 200b, the lengths X1, X2, and Y1 are set so that the first wiring portion 276 does not contact the right and left edges and the upper edge of the first cutout 107a. Additionally, even when the movable unit 200a is displaced to the maximum extent with respect to the fixing unit 200b, the first wiring portion 276 does not project downward from the first cutout 107a, and therefore, the length Y2 is set so as to be accommodated inside the outermost shape of the control substrate 100.

First, a description will be given of a case in which the movable unit 200a translationally moves in the right and left direction for image shake correction in the yaw direction. The length X1 is set to a value larger than the maximum movable amount of the leftward translational movement of the movable unit 200a, by using the position in a state in which the center of the movable unit 200a matches the optical axis P (initial state) as a reference. The length X2 is set to a value larger than the maximum movable amount of the rightward translation movement of the movable unit 200a by using the initial position as a reference. For image shake correction in the pitch direction, the movable unit 200a translationally moves in the upward and downward direction. The length Y1 is set to a value larger than the maximum movable amount of the upward translation movement of the movable unit 200a by using the initial position as a reference. The length Y2 is set to a value larger than the maximum movable amount of the downward translation movement of the movable unit 200a by using the initial position as a reference.

The positional relation between the second cutout 107b and the second wiring portion 277 is set in in manner that is the same as the positional relation between the first cutout 107a and the first wiring portion 276. Accordingly, even when the movable unit 200a is displaced to the maximum extent with respect to the fixing unit 200b, the second wiring portion 277 does not contact the right and left edges and the lower edge of the second cutout 107b. Additionally, even when the movable unit 200a is displaced to the maximum extent with respect to the fixing unit 200b, the second wiring portion 277 does not project upward from the second cutout 107b, and thus is accommodated inside the outermost shape of the control substrate 100.

Figure 9:
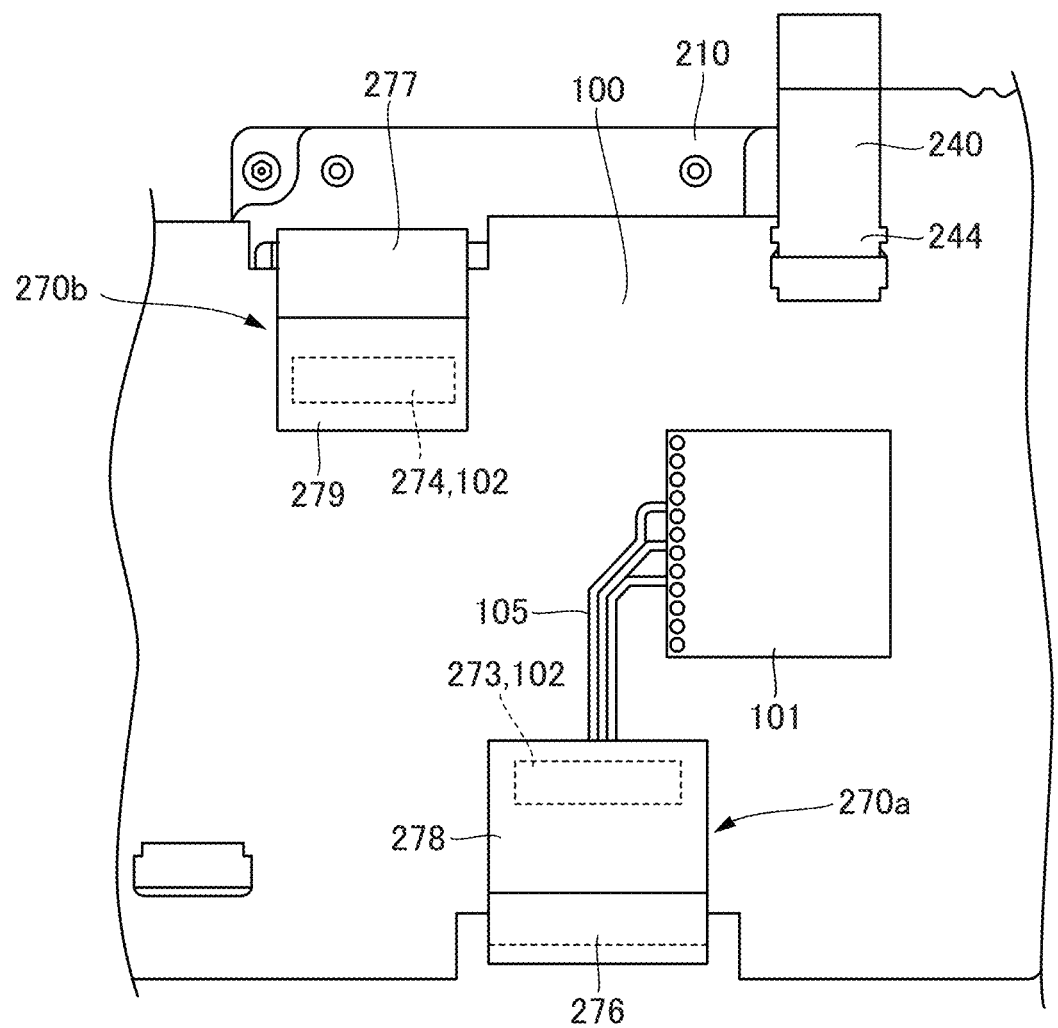
FIG. 9 is a front view of a wiring pattern deployed inside the control substrate according to the first embodiment.

Next, with reference to FIG. 6 to FIG. 9, a wiring pattern deployed inside the image pickup apparatus 10 will be described. FIG. 9 is a front view illustrating a wiring pattern deployed inside the control substrate 100. The first flexible substrate 270a is formed with high-speed transmission wiring electrically connected from the connector 271a (refer to FIG. 3) to the connector 273 (refer to FIG. 6) through the first wiring portion 276. The high-speed transmission wiring forms a transmission path using, for example, a transmission system such as an LVDS (Low Voltage Differential Signal) and having two signal lines as a pair. The image pickup apparatus 10 transmits an imaging signal between the image pickup element 230 and the control substrate 100 by using this high-speed transmission wiring, and corresponds to high-speed transmission of the imaging signal. The first flexible substrate 270a has, for example, ground wiring and wiring necessary for the image pickup element 230, in addition to high-speed transmission wiring.

On the second flexible substrate 270b, power supply wiring is formed that is electrically connected from the connector 271b (refer to FIG. 3) to the connector 274 (refer to FIG. 6) through the second wiring portion 277. The second flexible substrate 270b has, for example, ground wiring and wiring necessary for the image pickup element 230 in addition to power supply wiring.

The first and second flexible substrates 270a and 270b have a multilayer stacked structure, and in the present embodiment, they have a two-layer configuration. In the first flexible substrate 270a and the second flexible substrate 270b, the connectors 273 and 274 are mounted on a surface opposite to a surface on which the connectors 271a and 271b are mounted. The high-speed transmission wiring extends from the signal terminal line of the connector 271a and is electrically connected to the signal terminal line arranged in the terminal line on the back side when viewed from the connector 271a among the two parallel signal terminal lines of the connector 273. Specifically, the high-speed transmission wiring passes through the rear surface of the mounting surface of the connector 273, is electrically connected to the transmission path wired on the mounting surface of the connector 273 through a through hole, and is connected to the signal terminal disposed in the terminal row on the back when viewed from the connector 271a.

The control IC 101 shown in FIG. 9 is a control circuit unit that is disposed on the upper right of the connector 102 mounted on the control substrate 100, and has a rectangular package shape. A plurality of signal terminals provided in the control IC 101 are soldered to the control substrate 100 and are thereby electrically connected to the control substrate 100. At the control substrate 100, the high-speed transmission wiring 105 is three pairs of differential transmission wirings that electrically connect a part of the signal terminals of the connector 102 and the control IC 101. The high-speed transmission wiring 105 is electrically connected to the high-speed transmission wiring inside the first flexible substrate 270a through the connector 273 and the connector 102. The high-speed transmission wiring 105 forms a differential transmission path similar to the high-speed transmission wiring inside the first flexible substrate 270a. On the control substrate 100, although various signal wirings and ground wirings other than the high-speed transmission wiring 105 are deployed, they are not shown in FIG. 9.

In general, when a plurality of electrical signals required to be synchronized is transmitted in a high-speed transmission path, the design is made so that a difference in the delay time due to the wiring is sufficiently small. It is preferable that an isometric wiring is made so that the lengths of the wiring to which a plurality of electric signals are transmitted are equal. Additionally, the signal lines are wired as short as possible so that they are not affected by noise or the like. In order to shorten the length of the transmission path from the image shake correction unit 200 to the control IC 101 mounted on the control substrate 109, the connector 102 and the control IC 101 of the control substrate 100 are disposed as close as possible. Although FIG. 9 illustrates an example in which the control IC 101 is disposed on the upper right of the connector 102, the control IC 101 may be disposed on the left side or the right side of the connector 102. Thus, the wiring length of the high-speed transmission wiring can be further shortened.

As described above, the high-speed transmission path is wired on the first flexible substrate 270a, and the connector 271a mounted on the first connecting portion 275a and the connector 273 mounted on the second connecting portion 278 may be noise sources. For example, the connector 271a connected to the image pickup element substrate 231 is disposed on the side close to the radio antenna 10b (refer to FIG. 1A) built in the image pickup apparatus 10. In this case, it is necessary to suppress a deterioration of the radio performance due to the propagation of electromagnetic noises.

Additionally, since the first wiring portion 276 and the second wiring portion 277 are extended in directions opposite to each other in the upward and downward direction, the balance of loads applied when the movable unit 200a is displaced can be made uniform. Therefore, the drive control of the movable unit 200a can be prevented from becoming complicated and power consumption can be prevented from increasing. Additionally, since the amount of deformation per unit length of the flexible portions of the first and second flexible substrates 270a and 270b need not be designed to be excessively small, it is advantageous for the miniaturization of the image pickup apparatus 10.

In the present embodiment, the design is made so that the magnitudes of the reaction forces generated by the first flexible substrate 270a and the second flexible substrate 270b are substantially equal. Hence, the reaction forces of the first wiring portion 276 and the second wiring portion 277 are designed from the viewpoint of the bending rigidity taking into consideration the length, width, and thickness of both wiring portions. The thicknesses of the wiring paths of the first and second flexible substrates 270a and 270b can be individually designed. For example, the thickness of the second flexible substrate 270b is increased and the width of the second flexible substrate 270b is narrowed under the condition that the cross-sectional area is constant, so that the load between the first flexible substrate 270a and the second flexible substrate 270b is equal Thus, the width of the second flexible substrate 270b can be changed without changing the rated current value.

Figure 10:
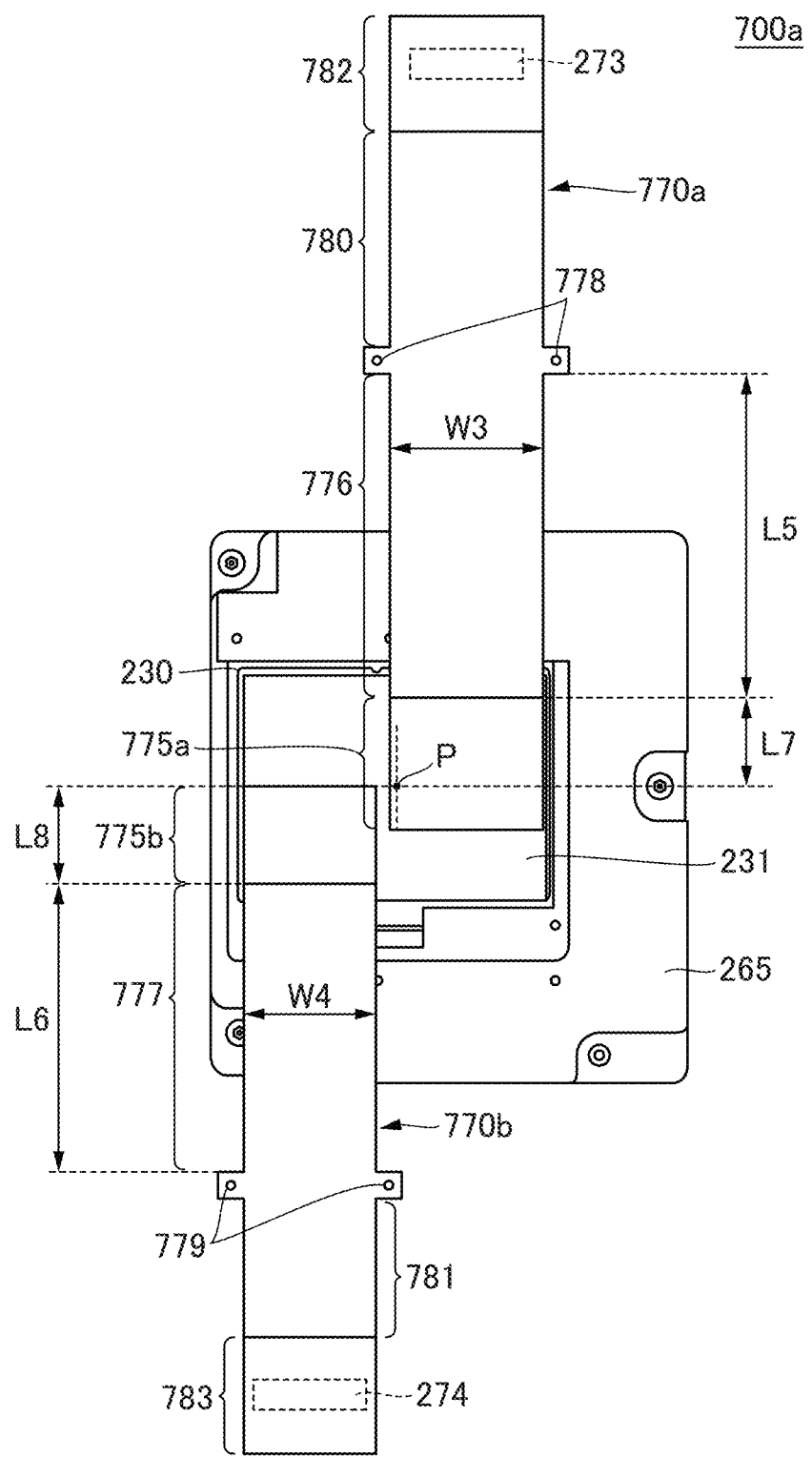
FIG. 10 is a rear view of the movable unit to which the flexible substrate is fixed according to the first embodiment.
Figure 11:
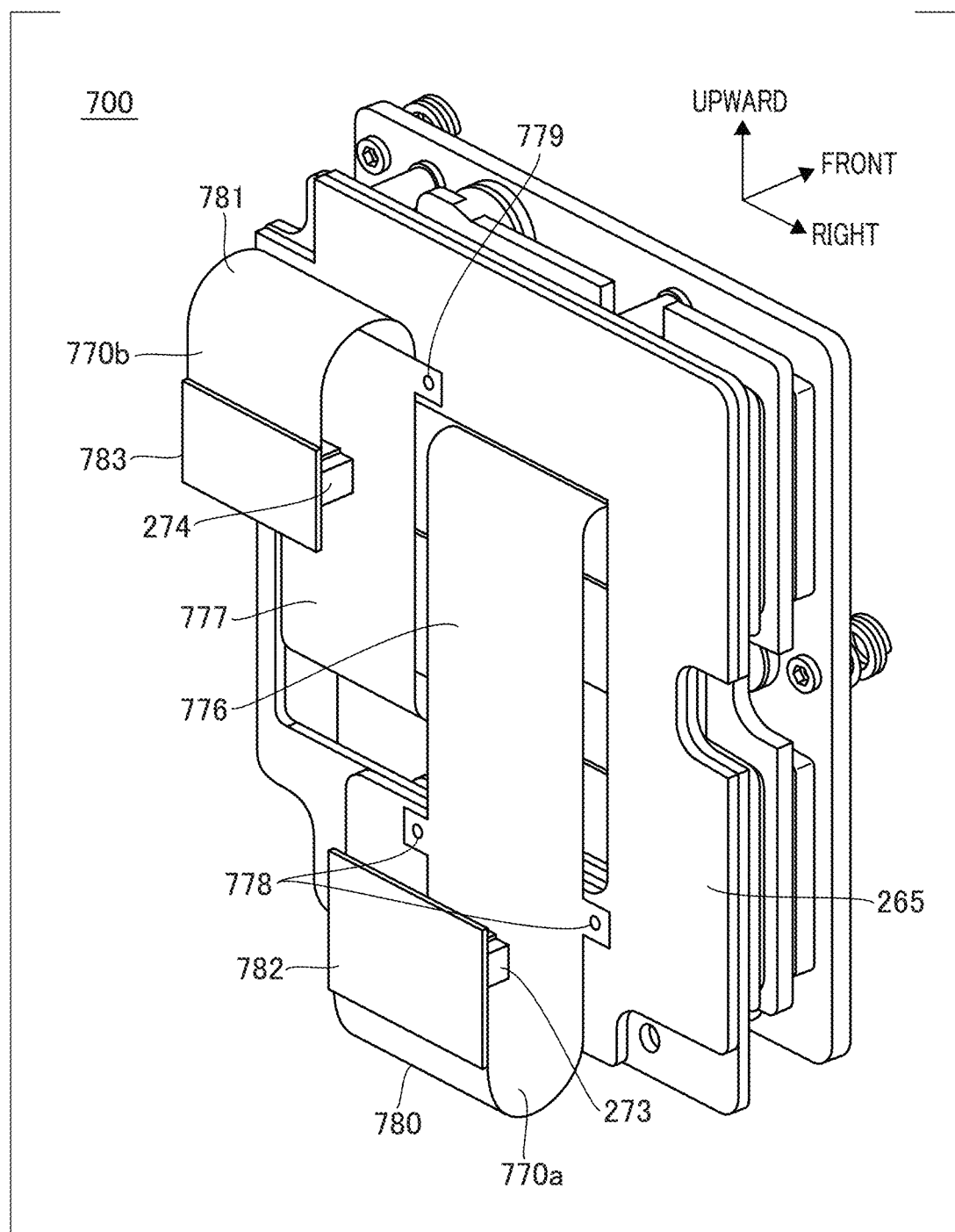
FIG. 11 is a perspective view of the image shake correction unit according to the first embodiment.
Figure 12:
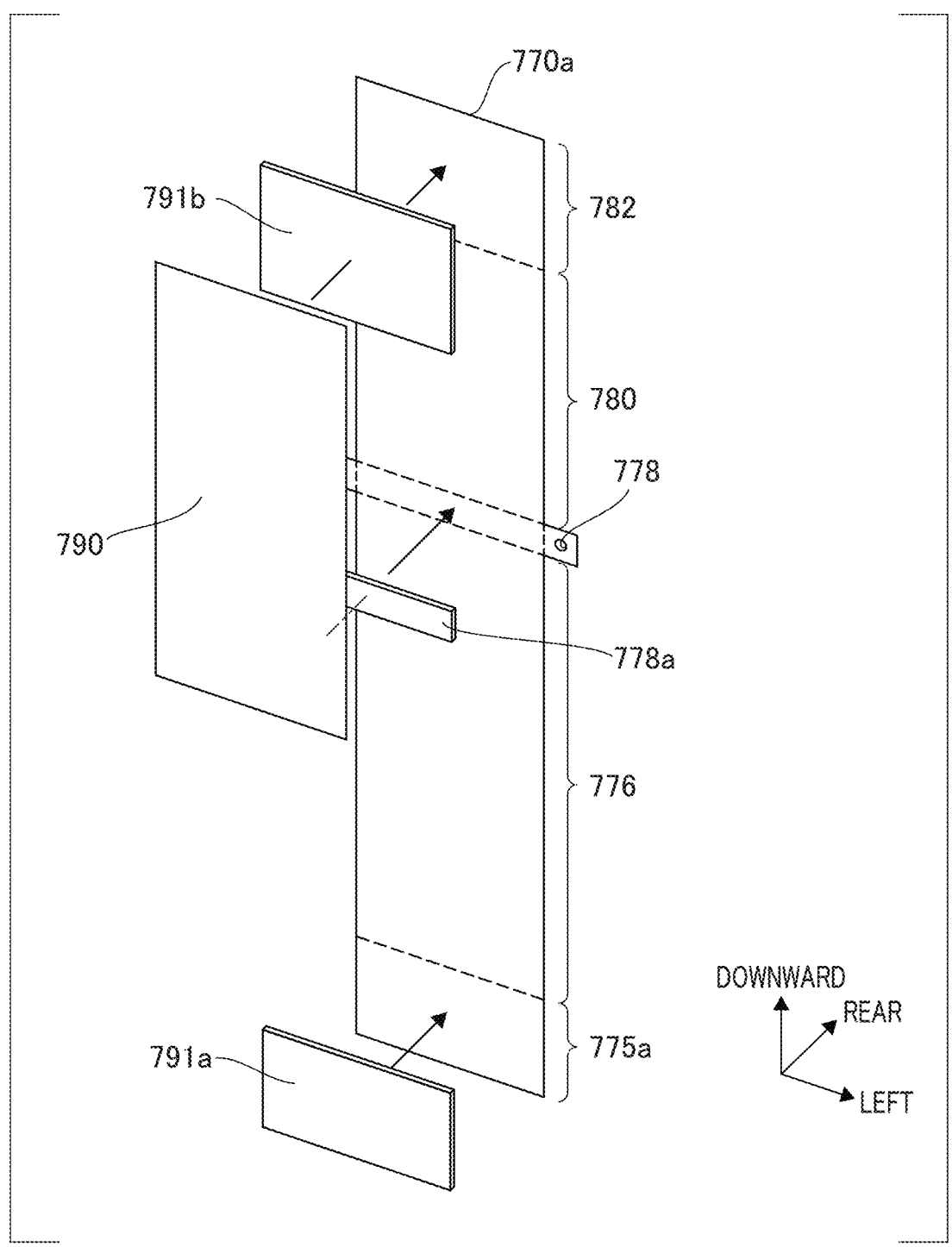
FIG. 12 is an exploded perspective view that illustrates countermeasures against an electromagnetic field noise in the first embodiment.
Figure 13:
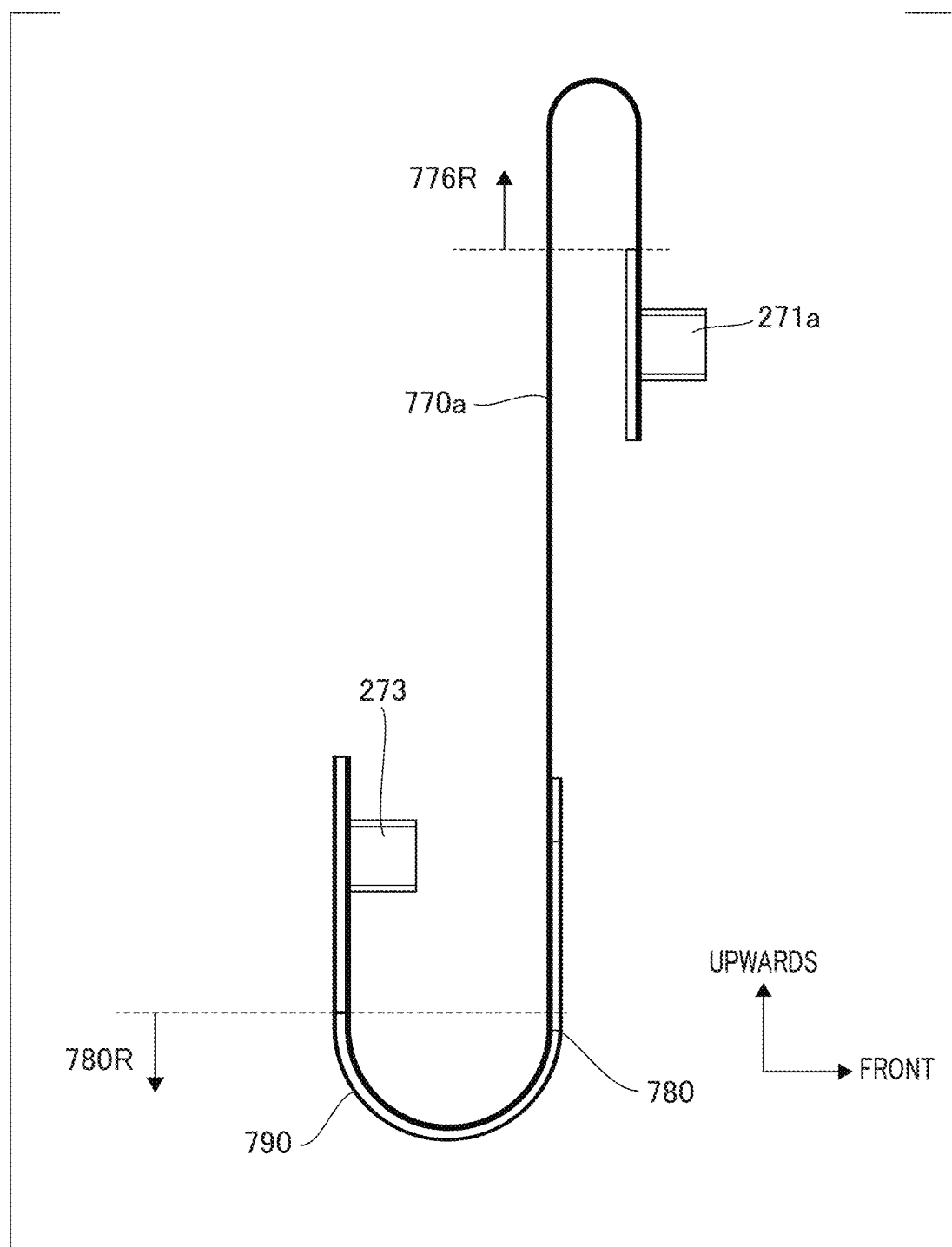
FIG. 13 is a side view that illustrates the countermeasures against the electromagnetic field noise in the first embodiment.

Next, with reference to FIG. 10 to FIG. 13, another configuration of the first and second flexible substrates and a detailed configuration of the rear yoke will be described. FIG. 10 is a rear view of the movable unit 700a to which a first flexible substrate 770a and a second flexible substrate 700b are fixed. FIG. 11 is a perspective view of the image shake correction unit 700. FIG. 12 is an exploded perspective view illustrating the attachment position of the electromagnetic field noise countermeasure components made on the first flexible substrate 770a. FIG. 13 is a side view of the first flexible substrate 770a to which the electromagnetic field noise countermeasure components are attached when the substrate is connected, as viewed from the right, and is simplified.

The image shake correction unit 700 corresponds to the image shake correction unit 200 described above, and the first flexible substrate 770a and a second flexible substrate 770b are attached to the image shake correction unit 700. The first and second flexible substrates 770a and 770b respectively correspond to the first and second flexible substrates 270a and 270b. A rear yoke 265 of the image shake correction unit 700 corresponds to the rear yoke 260 described above. The rear yoke 265 has a flat plate shape having a U-shaped outline when viewed from the direction of the optical axis P.

The first flexible substrate 770a has a first connection portion 775a, a wiring portion 776, a wiring portion 780, and a second connection portion 782 in the wiring direction (longitudinal direction) in order from the side close to a connector 271a (refer to FIG. 3). The connector 271a is disposed on the first connection portion 775a, and the connector 273 is disposed on the second connection portion 782. In contrast to the first flexible substrate 270a, the first connection portion 775a corresponds to the first connection portion 275a, the wiring portion 776 and the wiring portion 780 correspond to the first wiring portion 276, and the second connection portion 782 corresponds to the second connection portion 278.

The second flexible substrate 770b has a third connection portion 775b, a wiring portion 777, a wiring portion 781, and a fourth connection portion 783 in the wiring direction (longitudinal direction) in order from the side close to the connector 271b (refer to FIG. 3). In contrast to the second flexible substrate 270b, the third connection portion 775b corresponds to the third connection portion 275b, the wiring portion 777 and the wiring portion 781 correspond to the second wiring portion 277, and the fourth connection portion 783 corresponds to the fourth connection portion 279.

The wiring portion 776 of the first flexible substrate 770a extends from the first connection portion 775a in a direction orthogonal to the optical axis P (upward). The wiring portion 777 of the second flexible substrate 770b extends from the third connection portion 775b in a direction orthogonal to the optical axis P (downward). The first flexible substrate 770a is formed with a wiring path electrically connected from the connector 271a mounted on the first connection portion 775a to the connector 273 mounted on the second connection portion 782 through the wiring portions 776 and 780. The second flexible substrate 770b is formed with a wiring path electrically connected from the connector 271b mounted on the third connection portion 775b to the connector 274 mounted on the fourth connection portion 783 through the wiring portions 777 and 781. Since, in the first flexible substrate 770a and the second flexible substrate 770b, the surface on which the connectors are mounted is the same surface, the first flexible substrate 770a and the second flexible substrate 770b can be manufactured with a single-sided wiring structure. In the present embodiment, a single-sided wiring configuration that easily achieves a qualitatively soft configuration is adopted.

In the wiring direction of the first flexible substrate 770a, at a midpoint of the wiring portion between the first connection portion 775a and the second connection portion 782, a first fixing portion 778 is formed. Specifically, the first fixing portion 778 is provided between the wiring portion 776 and the wiring portion 780, and is fixed to the rear yoke 265 (FIG. 11). The first fixing portion 778 has two mounting portions projecting from the longitudinal side of the first flexible substrate 770a in the right and left direction orthogonal to the wiring direction.

In contrast, a second fixing portion 779 is formed in the wiring direction of the second flexible substrate 770b at a midpoint of the wiring portion between the third connection portion 775b and the fourth connection portion 783. Specifically, the second fixing portion 779 is provided between the wiring portion 777 and the wiring portion 781 and fixed to the rear yoke 265 (FIG. 11). The second fixing portion 779 has two mounting portions projecting from the longitudinal side of the second flexible substrate 770b in the right and left direction orthogonal to the wiring direction.

In the first fixing portion 778 and the second fixing portion 779, holes for positioning the rear yoke 265 are formed in the two mounting portions. The operator performs the positioning for the fixing portions 778 and 779 with the corresponding hole of the rear yoke 265 by using a jig or the like, and then fixes them to the rear yoke 265. Since the fixing portions 778 and 779 are fixed to the rear yoke 265, the positions of the fixing portions 778 and 779 are not displaced. Therefore, the region of the side of the second connection portion 782 in the flexible substrate 770a and the region of the side of the fourth connection portion 783 in the flexible substrate 770b are not displaced.

In the wiring portion 776, the flexural shape is maintained by fixing the first fixing portion 778 to the rear yoke 265 in a state in which a fixed amount of flexure is formed. Similarly, in the wiring portion 777, the flexural shape is maintained by fixing the second fixing portion 779 to the rear yoke 265 in a state in which a fixed amount of flexure is formed. The amount of flexure formed in the wiring portions 776 and 777 is set so that a predetermined amount can be maintained. The predetermined amount is a flexural amount that can be maintained without the wiring portions 776 and 777 being overextended when the movable unit 700a is displaced to a position furthest away from the optical axis P.

In the right and left direction, the wiring portions 776 and 777 are separated equal to or more than the maximum movable amount of the translation movement of the movable unit 700a in the right and left direction. This prevents the wiring portions from interfering with each other and affecting the load during image shake correction.

The wiring portion 776 and the wiring portion 777 are divided into two routes in the upper and lower directions, which is the translational movement direction of the movable unit 700a, and are extracted in the directions opposite to each other. Accordingly, when the movable unit 700a is driven in the right direction and when it is driven in the left direction, the loads caused by the deformation of the first and second flexible substrates 770a and 770b can be made uniform. Additionally, when the movable unit 700a is driven upward and when it is driven downward, the loads caused by the deformation of the first and second flexible substrates 770a and 770b can be made uniform.

With reference to FIG. 12 and FIG. 13, a configuration related to the electromagnetic field noise countermeasures performed on the first flexible substrate 770a will be described in detail. In the high-speed transmission path wired to the first flexible substrate 770a, when an electromagnetic field noise is generated from the high-speed transmission wiring, for the most part, the connection portion between the substrates can be a noise source. For example, it is necessary to prevent the connector 271a mounted on the first connection portion 775a from becoming a noise source. Additionally, it is necessary to perform countermeasures to prevent the electromagnetic field noise generated from the first flexible substrate 770a from propagating to a metal member inside the image pickup apparatus in close proximity to the first flexible substrate 770a and a metal exterior.

In the present embodiment, electromagnetic field noise countermeasures are adopted by using a radio wave absorber 790. The radio wave absorber 790 is, for example, a thin sheet member of about 100 μm (micrometer). The radio wave absorber 790 has a magnetic layer containing a powder of a magnetic material such as Sendust or Ferrite. However, the present invention is not limited to this, and other dielectrics and non-conductors may be used. The radio wave absorber 790 is configured to be adhered to a member by, for example, an acrylic double-sided tape or a thermosetting adhesive.

A plurality of insulating reinforcing material members 791b and 778a shown in FIG. 12 are used as separation members (spacers) for securing a predetermined distance between the radio wave absorber 790 and the wiring portion. An insulating reinforcing material member 791a is attached to the first connection portion 775a, and the insulating reinforcing material member 791b is attached to the second connection 782. The insulating reinforcing material member 778a is attached to a portion between the wiring portion 776 and the wiring portion 780, in other words, a portion between the two mounting portions of the first fixing portion 778.

On the rear surface side of the connector 273, the insulating reinforcing material members 791b and 778a are interposed between the first flexible substrate 770a and the radio wave absorber 790. Specifically, the radio wave absorber 790 is adhered and fixed to a part of the first flexible substrate 770a through the insulating reinforcing material members 791b and 778a. Although the radio wave absorber 790 is attached to the connection portion 782, which is a rigid portion of the first flexible substrate 780a, the radio wave absorber 790 is not attached to the first flexible substrate 770a in the wiring portion 780. In the substrate connection state, an upper curved portion 776R and a lower curved portion 780R are formed on the flexible substrate 770a, as shown in FIG. 13. Although the radio wave absorber 790 is curved to follow the flexible substrate 770a in the substrate connection state, a clearance is provided between the radio wave absorber 790 and the flexible substrate 770a in the wiring portion 780. In the wiring direction of the first flexible substrate 770a, since the radio wave absorber 790 is longer than the wiring portion 780, a clearance can be provided between the radio wave absorber 790 and the flexible substrate 770a. Note that the insulating reinforcing material member 778a is not limited to the example shown in FIG. 12, and the insulating reinforcing material member 778a may be provided in the wiring portion 776 to adhere the radio wave absorber 790.

The method described with reference to FIG. 12 and FIG. 13 is effective when the load on the wiring portion 770 of the first flexible substrate 770a significantly affects the performance of the image shake correction unit. Specifically, the configuration in which the radio wave absorber 790 is not disposed on the wiring portion 776 enables suppressing an increase in the load caused by the deformation of the flexible substrate when the movable unit 700a is displaced.

When high-speed transmission wiring represented by "LVDS" is adopted, it is necessary to manage signal quality. In the configuration in which the radio wave absorber 790 and the wiring portion 780 are in close contact or in contact with each other, the radio wave absorber 790 may affect signal transmission. According to the method described with reference to FIG. 12 and FIG. 13, a sufficient clearance can be secured between the radio wave absorber 790 and the wiring portion 780, so that the influence of signal transmission can be minimized. That is, it is preferable that a clearance between the radio wave absorber 790 that is a magnetic type having little influence on signal transmission and the wiring portion 780 can be secured by a predetermined amount or more.

The radio wave absorber 790 is attached to the first flexible substrate 770a, and specifically, is attached to the side of the insulating reinforcing material member 791b on the rear surface of the connector 273, in other words, on the exterior side of the image pickup apparatus. This is to prevent the propagation of the electromagnetic field noise from the first flexible substrate 770a to a member (for example, a metal member in the image pickup apparatus and a metal exterior member) (not illustrated), disposed on the bottom surface of the image pickup apparatus. By adopting the configuration of the present embodiment, the radio wave absorber 790 covers the entire surface (entire projected region) in the connector projection direction and the metal member so that the effect of countermeasures against the electromagnetic field noise can be further enhanced. The connector projection direction is a direction orthogonal to the arrangement direction of the terminals of the connector 273 (downward in FIG. 13).

Second Embodiment

Figure 14:
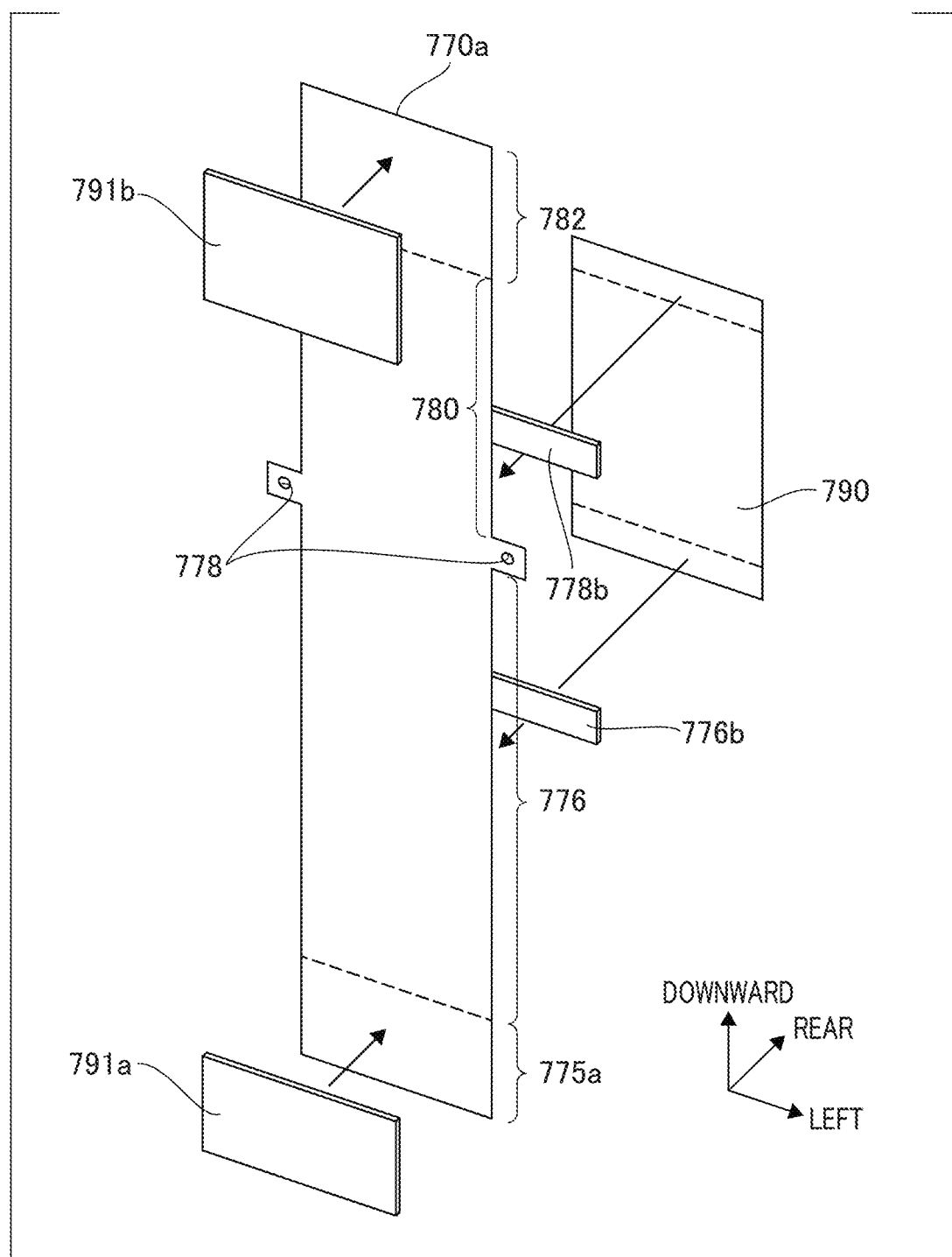
FIG. 14 is an exploded perspective view that illustrates the countermeasures against the electromagnetic field noise in the second embodiment.
Figure 15:
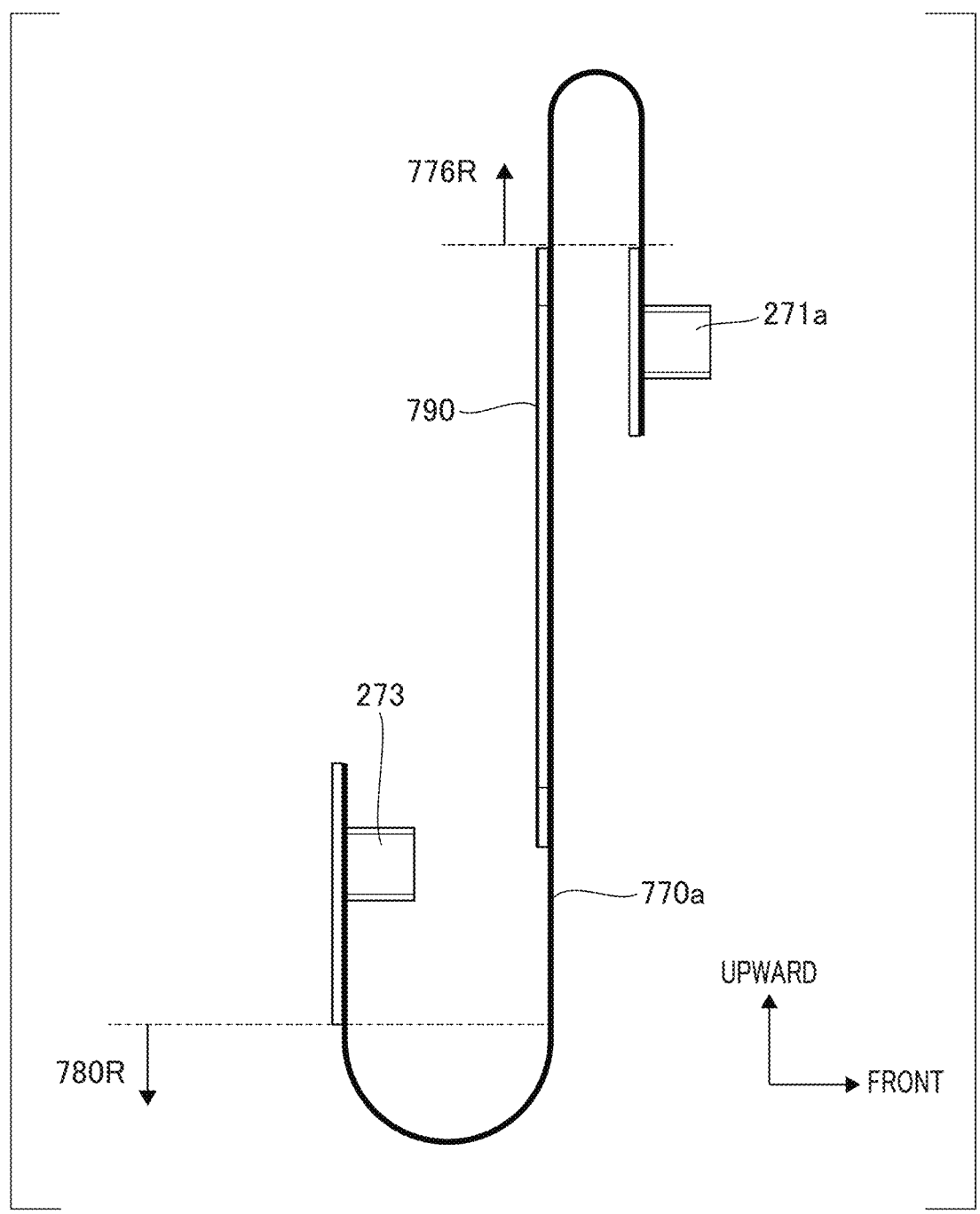
FIG. 15 is a side view that illustrates the countermeasures against the electromagnetic field noise in the second embodiment.

With reference to FIG. 10, FIG. 14, and FIG. 15, the second embodiment of the present invention will be described. In the present embodiment, the difference from the above embodiment will mainly be described with respect to the configuration in which the radio wave absorber 790 is attached to the first flexible substrate 770a. Note that the items that have already been explained are denoted by the reference numerals that have already been used, and the detailed description thereof will be omitted.

FIG. 14 is an exploded perspective view illustrating the attached position of the electromagnetic field noise countermeasure components on the first flexible substrate 770a in the present embodiment. FIG. 15 is a simplified side view viewed from the right illustrating the state in which the first flexible substrate 770a to which the electromagnetic field noise countermeasure component is attached is connected.

The first fixing portion 778 and the wiring portion 776 shown in FIG. 14 are disposed on insulating reinforcing material members 778b and 776b. The radio wave absorber 790 is partially adhered to the same surface as the mounting surface of the connector 271a of the first flexible substrate 770a. That is, in the region of the wiring portion 776 of the first flexible substrate 770a other than the curved portion 776R, the radio wave absorber 790 is attached. The curved portion 776R corresponds to the wiring portion 776 located above the upper end of the insulating reinforcing material member 791a of the first connection portion 775a in FIG. 15. In the substrate connection state, as shown in FIG. 15, although the flexible substrate 770a is deformed, a clearance is provided between the flexible substrate 770a and the radio wave absorber 790 in the wiring portion 776, which is a flexible portion.

The load on the curved portion 776R of the first flexible substrate 770a may significantly affect the performance of the image shake correction unit. According to the attaching method shown in FIG. 14, since the radio wave absorber 790 is not disposed on the curved portion 776R, an increase in the load caused by the deformation of the flexible substrate when the movable unit 700a is displaced can be suppressed. Moreover, when the radio wave absorber 790 and the flexible substrate 770a are arranged in contact or close proximity to each other, there is a possibility that signal transmission is affected. According to the attaching method shown in FIG. 14, the influence of signal transmission can be minimized by providing a clearance between the flexible substrate 770a and the radio wave absorber 790 in the wiring portion 776.

In contrast, when the high-speed transmission wiring represented by "LVDS" is used, the management of signal quality is required. In a configuration in which the radio wave absorber 790 and the wiring portion 776 are in close contact or in contact with each other, the radio wave absorber 790 may affect the signal transmission. According to the attaching method shown in FIG. 14, the influence of the signal transmission can be minimized by providing a clearance between the wiring portion 776 and the radio wave absorber 790. It is preferable that a clearance between the radio wave absorber 790 that is magnetic type having little influence on signal transmission and the wiring portion 776 can be secured by a predetermined amount or more.

The radio wave absorber 790 is partially adhered to the same surface as the mounting surface of the connector 271a of the first flexible substrate 770a. This is to prevent the propagation of the electromagnetic field noise from the flexible substrate 770a to a member (not illustrated) (for example, a metal member inside the image pickup apparatus) disposed on the rear of the image pickup apparatus. By adopting the configuration of the present embodiment, the radio wave absorber 790 covers the entire surface of the connector projection surface (entire projected region) and the metal member so that the effect of the electromagnetic field noise countermeasure can be further enhanced.

Next, the dimensions of each member will be described with reference to FIG. 10. The length from the boundary between the first connection portion 775a and the wiring portion 776 to the first fixing portion 778 is denoted by "L5". The length from the boundary between the third connection portion 775b and the wiring portion 777 to the second fixing portion 779 is denoted by "L6". The length from the optical axis P to the boundary between the first connection portion 775a and the wiring portion 776 is denoted by "L7", and the length from the optical axis P to the boundary between the third connecting portion 775b and the wiring portion 777 is denoted by "L8". In the right and left direction, the width of the wiring portion 776 is denoted by "W3" and the width of the wiring portion 777 is denoted by "W4".

Basically, in order to make the load balance caused by the deformation of the first and second flexible substrates 770a and 770b more uniform, the following settings are made:

Set the length L5 and the length L6 to substantially the same length

Set the length L7 and the length L8 to substantially the same length

Set the width W3 and the width W4 to substantially the same length

In contrast, the loads caused by the deformation of the flexible substrates differ depending on each layer configuration and each wiring width. Accordingly, the length L and the width W are adjusted so as to cancel variations in the load. As a result, the loads caused by the deformation of the first and second flexible substrates 770a and 770b can be made more uniform, thereby to make a contribution to the miniaturization of the image pickup apparatus 10 and the reduction of power consumption.

In the present embodiment, although the configuration in which the electromagnetic field noise countermeasures are performed on the first flexible substrate 770a has been described, the same countermeasure are applied to the second flexible substrate 770b as well. In this case, the second flexible substrate 770b is provided with a second radio wave absorber similar to the radio wave absorber 790. In addition to the configuration in which the first and second flexible substrates 770a and 770b and the third flexible substrate 240 are formed individually, there is an embodiment in which these are integrally configured.

According to the present embodiment, it is possible to reduce the electromagnetic field noise while suppressing an increase in a load applied when the movable unit is displaced. In particular, the radio wave absorber 790 covers the connector projection surface at the connection portion with the substrate and at the close-proximity portion of the flexible substrate and the metal member, which are easily a source of the electromagnetic field noise, thereby the effect of the countermeasures against the electromagnetic field noise can be further enhanced.

Moreover, in the present embodiment, since the wiring portion 776 and the wiring portion 777 are extended in directions opposite to each other in the upward and downward direction, the balance of loads applied when the movable unit 700a is displaced can be made uniform. The wiring portion 776 and 777 are mainly bent, and regions closer to the second connection portion 782 and the fourth connection portion 783 than the fixing portion 778 and 779 are hardly bent. Hence, in forming the cutouts 107a and 107b in the control substrate 100, it is not necessary to form the cutouts with a margin large enough by an amount considering the maximum displacement amount of the movable unit 700a. This is advantageous in enlarging the substrate area of the control substrate 100. Additionally, it is advantageous in forming the wiring portion 770 into an appropriate shape while aligning the high-speed transmission path wired inside the first flexible substrate 770a with an equal length wiring. Therefore, the degree of freedom of the component arrangement and wiring of the control substrate 100 can be improved while ensuring the transmission quality of the high-speed transmission path.

As a modification of the present embodiment, there is a configuration in which the first fixing portion 778 and the second fixing portion 779 are fixed to the rear yoke 265 through, for example, individual holding members. In this case, the holding member is provided with a cylindrical positioning shape portion, and the holes provided in the fixing portions 778 and 779 are fitted into the positioning shape portion. Additionally, by forming a slit portion or the like in the wiring portions 776 and 777 along a direction parallel to the wiring path, a load caused by deformation can be reduced. This is advantageous in controlling the image shake correction unit 700 with higher accuracy.

As described above, the image pickup apparatus 10 includes the fixing unit 200b serving as a support member, a movable unit 200a serving as a movable member, and the control substrate 100 configuring a control unit. The movable member is supported to be displaceable with respect to the support member, and the control unit controls the movement of the movable member. The flexible substrate electrically connects a circuit unit and is provided in the movable member and the control unit. The sheet-like radio wave absorber 790 is partially fixed to the flexible substrate through separation members (776b, 778a, 778b, and 791b). Preferably, the flexible substrate has a first connection portion connected to the movable member, a wiring portion extending from the connection portion, and a second connection portion disposed at an end portion of the wiring portion and connected to the control unit. The radio wave absorber is partially attached in the vicinity of the first or second connection portion.

Additionally, the movable member is supported by the support member so as to be displaceable in a direction orthogonal to a predetermined axis (optical axis P) with respect to the support member. For example, an image shake correction unit that corrects an image shake by the movement of the movable member is configured. The image shake correction unit is provided with an electromagnetic driving means (coil and permanent magnet) that drives the movable member. The control unit controls the image shake correction unit to displace the image pickup element or the optical members such as a lens or a prism together with the movable member relative to the support member.

In the above embodiments described above, the image pickup apparatus is described as an example of an electronic apparatus. The present invention is not limited to this, and the present invention can be applied to various types of electronic apparatuses in which the movable member supported by the support member in a displaceable state and the control substrate are connected by a flexible substrate. An electronic apparatus that can reduce electromagnetic field noise can be provided while suppressing an increase in the load when the movable member is displaced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-059991, filed Mar. 30, 2020, which is hereby incorporated by reference wherein in its entirety.

What is claimed is:

1. An electronic apparatus comprising:
a movable member and a support member configured to support the movable member;
a controller configured to control a circuit unit provided in the movable member;
a first wiring member configured to have flexibility and electrically connect the circuit unit and the controller;
a radio wave absorber formed in a sheet shape; and
a separation member configured to separate the radio wave absorber from the first wiring member,
wherein the first wiring member comprises:
a first connection portion configured to be connected to the circuit unit;
a second connection portion configured to be connected to the controller; and
a wiring portion configured to extend from the first connection portion to the second connection portion, and
wherein the radio wave absorber is fixed to any one of a plurality of curved portions of the first wiring member through the separation member or is fixed to a position different from the curved portions through the separation member.

2. The electronic apparatus according to claim 1, wherein the radio wave absorber is fixed to the second connection portion and a part of the wiring portion through a plurality of separation members.

3. The electronic apparatus according to claim 1, further comprising a plurality of connectors respectively disposed at the first and second connection portions, wherein the radio wave absorber is fixed to a surface on which the connectors are mounted in the first wiring member through the separation member.

4. The electronic apparatus according to claim 1, wherein the movable member is supported by the support member in a state in which the movable member is displaceable in the first direction with respect to the support member and in the second direction orthogonal to the first direction, and
wherein the wiring portion extends in the first direction from the first connection portion.

5. The electronic apparatus according to claim 1 further including a second wiring member configured to have flexibility and electrically connect the circuit unit and the controller,
the second wiring member comprising:
a third connection portion configured to be connected to the circuit unit;
a wiring portion configured to extend from the third connection portion; and
a fourth connection portion configured to be connected to the controller.

6. The electronic apparatus according to claim 5, wherein a wiring portion of the first wiring member extends in a first direction from the first connection portion, and
wherein a wiring portion of the second wiring member extends in a second direction opposite to the first direction.

7. The electronic apparatus according to claim 6, wherein the wiring portion of the first or second wiring member has a fixing unit, and
wherein the fixing unit is fixed to the support member or fixed to the support member through a holding member.

8. The electronic apparatus according to claim 1, wherein the first wiring member has differential transmission wiring.

9. The electronic apparatus according to claim 5, wherein the second wiring member has power supply wiring.

10. The electronic apparatus according to claim 5, wherein the wiring portion of the first wiring member and the wiring portion of the second wiring member have the same length or the same width.

11. The electronic apparatus according to claim 5,
wherein the wiring portion of the first wiring member has a first fixing unit,
wherein the wiring portion of the second wiring member has a second fixing unit, and
wherein the first and second fixing units are fixed to the support member or fixed to the support member through a holding member.

12. The electronic apparatus according to claim 11,
wherein the length from the first connection portion to the first fixing unit in the wiring direction of the first wiring member is equal to the length from the third connection portion to the second fixing unit in the wiring direction of the second wiring member.

13. The electronic apparatus according to claim 12,
wherein the width in a direction orthogonal to the wiring direction in the wiring portion of the first wiring member is equal to the width in a direction orthogonal to the wiring direction in the wiring portion of the second wiring member.

14. The electronic apparatus according to claim 1 further including a correction unit configured to correct an image shake by a movement of the movable member,
wherein the controller controls the drive of the correction unit by controlling the displacement of the movable member relative to the support member.

15. The electronic apparatus according to claim 14 further comprising an image pickup element,
wherein the correction unit performs image shake correction by the displacement of the movable member and the image pickup element.

16. The electronic apparatus according to claim 15,
wherein the electronic apparatus incorporates a radio antenna used for communication with an external device.

* * * * *